United States Patent
Solomon et al.

(10) Patent No.: US 6,681,293 B1
(45) Date of Patent: Jan. 20, 2004

(54) METHOD AND CACHE-COHERENCE SYSTEM ALLOWING PURGING OF MID-LEVEL CACHE ENTRIES WITHOUT PURGING LOWER-LEVEL CACHE ENTRIES

(75) Inventors: Doug Solomon, Los Altos, CA (US); Asgeir T. Eiriksson, Sunnyvale, CA (US); Yuval Koren, San Francisco, CA (US); Givargis G. Kaldani, Los Gatos, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 467 days.

(21) Appl. No.: 09/650,100

(22) Filed: Aug. 25, 2000

(51) Int. Cl.[7] .................................. G06F 12/08
(52) U.S. Cl. ..................... 711/122; 711/120; 711/124; 711/138
(58) Field of Search ................... 711/118, 119, 711/120, 121, 122, 138, 135, 130, 141, 124, 133

(56) References Cited

U.S. PATENT DOCUMENTS

| | | | |
|---|---|---|---|
| 4,477,713 A | 10/1984 | Cook et al. | 219/124.34 |
| 4,514,749 A | 4/1985 | Shoji | 257/664 |
| 4,587,445 A | 5/1986 | Kanuma | 326/28 |
| 4,823,184 A | 4/1989 | Belmares-Sarabia et al. | 348/650 |
| 4,896,272 A | 1/1990 | Kurosawa | 716/8 |
| 4,926,066 A | 5/1990 | Maini et al. | 327/565 |
| 5,295,132 A | 3/1994 | Hashimoto et al. | 370/242 |
| 5,315,175 A | 5/1994 | Langner | 326/21 |
| 5,394,528 A | 2/1995 | Kobayashi et al. | 710/307 |
| 5,416,606 A | 5/1995 | Katayama et al. | 358/467 |
| 5,481,567 A | 1/1996 | Betts et al. | 375/261 |
| 5,490,252 A | 2/1996 | Macera et al. | 709/249 |
| 5,506,953 A | 4/1996 | Dao | 345/564 |
| 5,521,836 A | 5/1996 | Hartong et al. | 716/10 |

(List continued on next page.)

OTHER PUBLICATIONS

"Low Power Quad Differential Line Driver with Cut–Off", *National Semiconductor, F100K ECL 300 Series Databook and Design Guide*, pp. 2–54–2–60, (1992).

"The SA27 library includes programmable delay elements Delaymuxo and Delaymuxn. How are these cells used!", *IBM Delaymuxn Book*, (Feb. 1999),pp. 1–6.

Brewer, Kevan, "Re: Memory mapped registers", (*Online*): comp.arch.embedded, (May 2, 1996).

(List continued on next page.)

*Primary Examiner*—Pierre Michel Bataille
(74) *Attorney, Agent, or Firm*—Schwegman, Lundberg, Woessner & Kluth, P.A.

(57) ABSTRACT

A method and apparatus for purging data from a middle cache level without purging the corresponding data from a lower cache level (i.e., a cache level closer to the processor using the data), and replacing the purged first data with other data of a different memory address than the purged first data, while leaving the data of the first cache line in the lower cache level. In some embodiments, in order to allow such mid-level purging, the first cache line must be in the "shared state" that allows reading of the data, but does not permit modifications to the data (i.e., modifications that would have to be written back to memory). If it is desired to modify the data, a directory facility will issue a purge to all caches of the shared-state data for that cache line, and then the processor that wants to modify the data will request an exclusive-state copy to be fetched to its lower-level cache and to all intervening levels of cache. Later, when the data in the lower cache level is modified, the modified data can be moved back to the original memory from the caches. In some embodiments, a purge of all shared-state copies of the first cache-line data from any and all caches having copies thereof is performed as a prerequisite to doing this exclusive-state fetch.

29 Claims, 14 Drawing Sheets

U.S. PATENT DOCUMENTS

| | | | | |
|---|---|---|---|---|
| 5,535,223 | A | 7/1996 | Horstmann et al. | 714/744 |
| 5,544,203 | A | 8/1996 | Casasanta et al. | 375/376 |
| 5,555,188 | A | 9/1996 | Chakradhar | 716/6 |
| 5,603,056 | A | 2/1997 | Totani | 710/8 |
| 5,604,450 | A | 2/1997 | Borkar et al. | 326/82 |
| 5,617,537 | A | 4/1997 | Yamada et al. | 709/214 |
| 5,657,346 | A | 8/1997 | Lordi et al. | 375/224 |
| 5,682,512 | A | 10/1997 | Tetrick | 711/202 |
| 5,757,658 | A | 5/1998 | Rodman et al. | 716/10 |
| 5,778,429 | A | 7/1998 | Sukegawa et al. | 711/129 |
| 5,784,706 | A | 7/1998 | Oberlin et al. | 711/202 |
| 5,787,268 | A | 7/1998 | Sugiyama et al. | 716/11 |
| 5,793,259 | A | 8/1998 | Chengson | 331/78 |
| 5,811,997 | A | 9/1998 | Chengson et al. | 327/112 |
| 5,828,833 | A | 10/1998 | Belville et al. | 713/209 |
| 5,844,954 | A | 12/1998 | Casasanta et al. | 375/373 |
| 5,847,592 | A | 12/1998 | Gleim et al. | 327/403 |
| 5,898,729 | A | 4/1999 | Boezen et al. | 375/259 |
| 5,910,898 | A | 6/1999 | Johannsen | 716/1 |
| 5,915,104 | A | 6/1999 | Miller | 710/310 |
| 6,005,895 | A | 12/1999 | Perino et al. | 375/288 |
| 6,016,553 | A | 1/2000 | Schneider et al. | 714/21 |
| 6,314,491 | B1 * | 11/2001 | Freerksen et al. | 711/124 |
| 6,314,498 | B1 * | 11/2001 | Arimilli et al. | 711/144 |
| 6,360,301 | B1 * | 3/2002 | Gaither et al. | 711/143 |
| 6,397,302 | B1 * | 5/2002 | Razdan et al. | 711/141 |
| 6,412,056 | B1 | 6/2002 | Gharachorloo et al. | 711/202 |
| 6,415,362 | B1 * | 7/2002 | Hardage et al. | 711/142 |
| 6,493,801 | B2 * | 12/2002 | Steely et al. | 711/135 |

OTHER PUBLICATIONS

Djordjevic, A. R., et al., "Time Domain Response of Multiconductor Transmission Lines", *Proceedings of the IEEE, 75(6)*, (Jun. 1987), 743–64.

Gjessing, et al., "Performance of the RamLink Memory Achritecture", *Proceedings HICSS'94*, (1994), 154–162.

Gjessing, Stein , et al., "RamLink: A High–BandwidthPoint–to–Point Memory Architecture", *Proceeding CompCon*, (1992),328/331.

"IEEE Standard for High–Bandwidth Memory Interface Based on Scalable Coherent Interface(SCI) Signaling Technology (RAMLink)", *IEEE Std 1596.4–1996*, (1996), 1–91.

Im, G. , et al., "Bandwidth–Efficient Digital Transmission over Unshielded Twisted–Pair Wiring", *IEEE Journal on Selected Areas in Communications, 13(9)*, (Dec. 1995), 1643–1655.

Mooney, Randy , et al., "A 900 Mb/s Bidirectional Signaling Scheme", *IEEE Journal of Solid–State Circuits, 30(12)*, (Dec. 1995), 1538–1543.

Rao, A. , "Memory mapped registers", new://comp.arch.ambedded, (Apr. 27, 1996).

Takahashi, T. , et al., "110GB/s Simultaneous Bi–Directional Transceiver Logic Synchronized with a System Clock", *IEEE International Solid–State Circuits Conference*, (1999), 176–177.

* cited by examiner

SYNERGY UNCACHED ADDRESS MAP

| SYNERGY ADDRESS | | BEDROCK ADDRESS | | |
|---|---|---|---|---|
| 16 T MINUS 1 BYTE (1T) 15T | RESERVED | | | |
| 15 T MINUS 1 BYTE (1T) 14T | SSPEC | | | |
| 14 T MINUS 1 BYTE (1T) 13T | RESERVED | | | |
| 13 T MINUS 1 BYTE (1T) 12T | UNCAC | UNCAC | 1 T MINUS 1 BYTE 0T | (ATTR=3) |
| 12 T MINUS 1 BYTE (1T) 11T | HSPEG | HSPEG | 1 T MINUS 1 BYTE 0T | (ATTR=0) |
| 11 T MINUS 1 BYTE (1T) 10T | IOSPEC | IOSPEC | 1 T MINUS 1 BYTE 0T | (ATTR=1) |
| 10 T MINUS 1 BYTE (1T) 9T | MSPEC | MSPEC | 1 T MINUS 1 BYTE 0T | (ATTR=2) |
| 9 T MINUS 1 BYTE (1T) 8T | UNCAC | UNCAC | 1 T MINUS 1 BYTE 0T | (ATTR=3) |
| 8 T MINUS 1 BYTE (1T) 7T | RESERVED | | | |
| 7 T MINUS 1 BYTE (1T) 6T | SSPEC | | | |
| 6 T MINUS 1 BYTE (1T) 15T | RESERVED | | | |
| 5 T MINUS 1 BYTE (1T) 4T | UNCAC | UNCAC | 1 T MINUS 1 BYTE 0T | (ATTR=3) |
| 4 T MINUS 1 BYTE (1T) 3T | HSPEC | HSPEC | 1 T MINUS 1 BYTE 0T | (ATTR=0) |
| 3 T MINUS 1 BYTE (1T) 2T | IOSPEC | IOSPEC | 1 T MINUS 1 BYTE 0T | (ATTR=1) |
| 2 T MINUS 1 BYTE (1T) 1T | MSPEC | MSPEC | 1 T MINUS 1 BYTE 0T | (ATTR=2) |
| 1 T MINUS 1 BYTE (1T) 0T | UNCAC | UNCAC | 1 T MINUS 1 BYTE 0T | (ATTR=3) |

Rows 13T–9T (top half UNCAC through UNCAC): INVERSE SWIZZLING POLARITY
Rows 5T–1T (bottom half UNCAC through UNCAC): INVERSE SWIZZLING POLARITY

FIG. 3

| FSB REQUEST TYPE | GCE DETERMINES RESPONSE | GENERATE AS MATER | PASS TO GCE |
|---|---|---|---|
| DEFERRED REPLY | n | y | y |
| INTERRUPT ACK | n | n | n -- STATUS PULSE (ERROR) |
| SHUTDOWN | n | n | n -- STATUS PULSE |
| FLUSH (INVD) | n | y | y |
| HALT | n | n | n -- STATUS PULSE |
| SYNC (WBINVD) | n | n | n -- STATUS PULSE |
| FLUSH ACK | n | n | n -- COUNTED AS PART OF FLUSH OP |
| xTPR | n | n | n -- STATUS PULSE (ERROR) |
| INTERRUPT | n | y | y |
| PURGE TC | n | y | y |
| I/O READ | y | n | n |
| I/O WRITE | y | n | n |
| MEMORY READ & INV | y | y* | y |
| MEMORY READ | y | y* | y |
| MEMORY WRITE | y | n | n |
| ALL RESERVED | n | n | n -- STATUS PULSE (ERROR) |

\* -- INVALIDATES AND INTERVENTIONS

FIG. 6

| INCOMING TRANSACTION | REORDER REGISTER | ACTION |
|---|---|---|
| 8-BYTE WC | CLOSED | ALLOCATE FREE DATA BUFFER AND WRITE 8-BYTE DATA<br>OPEN RR AND SET DATA VALID BIT |
| | OPEN HIT | WRITE DATA IN DATA BUFFER<br>SET DATA VALID BIT IN RR<br>ISSUED UWACK |
| | OPEN MISS | PLACE WC ENTRY IN ADDRESS FIFO WITH RR ADDRESS/ VALID BITS<br>CLOSE RR<br>ALLOCATE FREE DATA BUFFER AND WRITE DATA<br>OPEN RR AND SET DATA VALID BIT |
| 64-BYTE WC | CLOSED | ALLOCATE FREE DATA BUFFER AND WRITE 64-BYTE DATA<br>PLACE WC ENTRY IN ADDRESS FIFO WILL ALL DATA VALID |
| | OPEN | PLACE WC ENTRY IN ADDRESS FIFO WITH RR ADDRESS/ VALID BITS<br>CLOSE RR<br>ALLOCATE FREE DATA BUFFER AND WRITE 64-BYTE DATA<br>PLACE WC ENTRY IN ADDRESS FIFO WILL ALL DATA VALID |
| 8-BYTE UC | CLOSED | ALLOCATE FREE UC DATA BUFFER<br>PLACE UC ENTRY IN ADDRESS FIFO |
| | OPEN | PLACE WC ENTRY IN ADDRESS FIFO WITH RR ADDRESS/ VALID BITS<br>CLOSE RR<br>ALLOCATE FREE UC DATA BUFFER<br>PLACE UC ENTRY IN ADDRESS FIFO |

FIG. 12

| ERROR INTERRUPT | ERROR INTERRUPT | ERROR INTERRUPT | ERROR INTERRUPT |
|---|---|---|---|
| PARITY ERROR ON INCOMING SYSCMD BUS | ADDRESS CYCLE OF INTERRUPT | YES | SI WILL DISCARD REQUEST |
| | ADDRESS CYCLE OF INVALIDATE OR INTERVENTION | YES | SI WILL DISCARD REQUEST |
| | 1ST DATA CYCLE | YES | SI WILL DISCARD RESPONSE |
| | 2ND + DATA CYCLE | YES | |
| CORRECTABLE ERROR ON INCOMING SYSAD BUS | ADDRESS OR DATA CYCLE AND SYSCMD OK | YES | CORRECT AND CONTINUE |
| UNCORRECTABLE ERROR ON INCOMING SYSAD BUS | ADDRESS CYCLE AND SYSCMD OK | YES | SI WILL DISCARD REQUEST |
| | 1ST DATA CYCLE AND SYSCMD OK | YES | SI WILL SET BAD DATA INDICATOR IN DATA RESPONSE BUFFER |
| | 2ND + DATA CYCLE | YES | |
| PARITY ERROR ON INCOMING SYSRESP BUS | | YES | SI WILL DISCARD RESPONSE |

FIG. 13

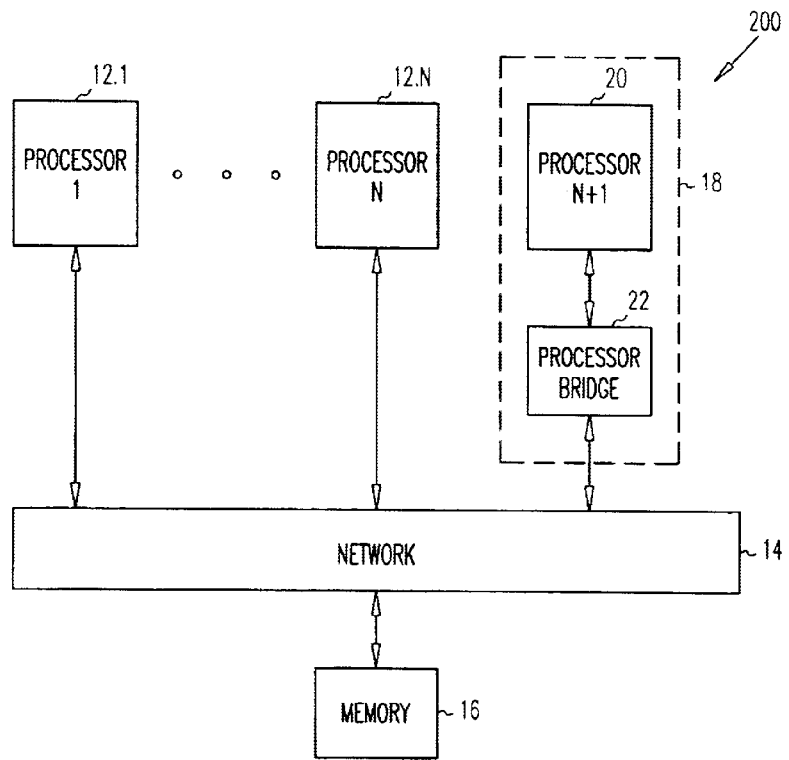

FIG. 14

METHOD AND CACHE-COHERENCE SYSTEM ALLOWING PURGING OF MID-LEVEL CACHE ENTRIES WITHOUT PURGING LOWER-LEVEL CACHE ENTRIES

CROSS-REFERENCE TO RELATED APPLICATIONS

This application is related to a U.S. Patent Application entitled "CACHE LINE CONVERTER," Ser. No. 09/650, 101, filed on Aug. 25, 2000: a U.S. Patent Application entitled "DRAM MICROPROCESSOR CACHE WITH ON-CHIP TAGS," Ser. No. 09/652,797, filed on Aug. 31, 2000; a U.S. Patent Application entitled "METHOD AND CACHE-COHERENCE SYSTEM ALLOWING PURGING OF MID-LEVEL CACHE ENTRIES WITHOUT PURGING LOWER-LEVEL CACHE ENTRIES," Ser. No. 09/650,100, filed on Aug. 25, 2000: and a U.S Patent application entitled "MULTIPROCESSOR NODE CONTROLLER CIRCUIT AND METHOD," Ser. No. 09/407, 428, filed on Sep. 29, 1999, each incorporated herein by reference.

FIELD OF THE INVENTION

This invention relates generally to computer cache memories, and more particularly to a cache-coherence system and a method for allowing purging of mid-level cache entries without purging lower-level cache entries.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Silicon Graphics Incorporated, All Rights Reserved.

BACKGROUND OF THE INVENTION

Parallel computer systems provide economic, scalable, and high-availability approaches to computing solutions. From the point of view of managing computer systems including parallel-processor systems, there is a need for a cache coherence system and control in order to obtain desired system operation.

Conventional hierarchical cache systems provide small fast cache memories next to fast information processing units, and larger slower memories that are further away in time and space. It is too expensive to make a fast memory large enough to hold all of the data for a large computer program, and when memories are made larger, the access times slow down and heat dissipation also becomes a problem.

Modern computer systems thus typically include a hierarchy of memory systems. For example, a processor might have an L0 cache on the same chip as a processor. This L0 cache is the smallest, perhaps 16 to 256 kilobytes (KB), and runs at the fastest speed since there are no chip-boundary crossings. An L1 cache might be placed next to the processor chip on the same chip carrier. This L1 cache is the next smallest, perhaps 0.5 to 8 megabytes (MB), and runs at the next fastest speed since there are chip-boundary crossings but no card-boundary crossings. An L2 cache, if implemented, might be placed next to the processor card in the same box but on a different chip carrier. This L2 cache is typically still larger than the L1 and runs at the next fastest speed since there are card-boundary crossings but no box-boundary crossings. A large main memory, typically implemented using RDRAMs (RAMBUS™ dynamic random-access memories) or DDR SDRAMs (double-data-rate synchronous dynamic random-access memories) is then typically provided. Beyond that, a disc array provides mass storage at a slower speed than main memory, and a tape farm can even be provided to hold truly enormous amounts of data, accessible within seconds, minutes or hours. At each level moving further from the processor, there is typically a larger store running at a slower speed. For each level of storage, the level closer to the processor thus contains a proper subset of the data in the level further away. For example, in order to purge data in the main memory leaving that data in the disc storage, one must first purge all of the portions of that data that may reside in the L0, L1, and/or L2 levels of cache. Conventionally, this may not lead to any performance problems, since the processor is finished with the data by the time that the main memory is purged.

However, as more processors and more caches are added to a system, there can be more competition for scarce cache resources. There is a need to maintain coherence of data (i.e., ensuring that as data is modified, that all cached copies are timely and properly updated) among the various cache types, levels, and locations. Thus there is a need for improved methods and apparatus to improve system performance while also maintaining system integrity and cache coherence.

SUMMARY OF THE INVENTION

The present invention provides solutions to the above-described shortcomings in conventional approaches, as well as other advantages apparent from the description and appendices below.

The present invention provides a method and apparatus for purging data (e.g., a first cache line) from a middle cache level without purging the corresponding data from a lower cache level (i.e., a cache level closer to the processor using the data), and replacing the purged first data in the middle-level cache with other data (e.g., with another cache line) of a different memory address than the purged first data, while leaving the data of the first cache line in the lower cache level. In some embodiments, in order to allow such mid-level purging, the first cache line must be in the "shared state" that allows reading of the data, but does not permit modifications to the data. If it is desired to modify the data, a directory facility will issue a purge to all caches of the shared-state data for that cache line, and then the processor that wants to modify the data will request an exclusive-state copy to be fetched to its lower-level cache and to all intervening levels of cache. Later, when the data in the lower cache level is modified, the modified data can be moved back to the original memory from the caches.

BRIEF DESCRIPTION OF THE DRAWINGS

FIG. 3 shows an address map 300 used by one embodiment of the present invention.

FIG. 6 shows a table 600 of request types.

FIG. 12 shows a table of actions versus incoming transactions 1200.

FIG. 13 shows a table of SI detected SysAD errors 1300.

FIG. 14 shows an embodiment of the present invention, a multiprocessor computer system 200.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Figure 1:
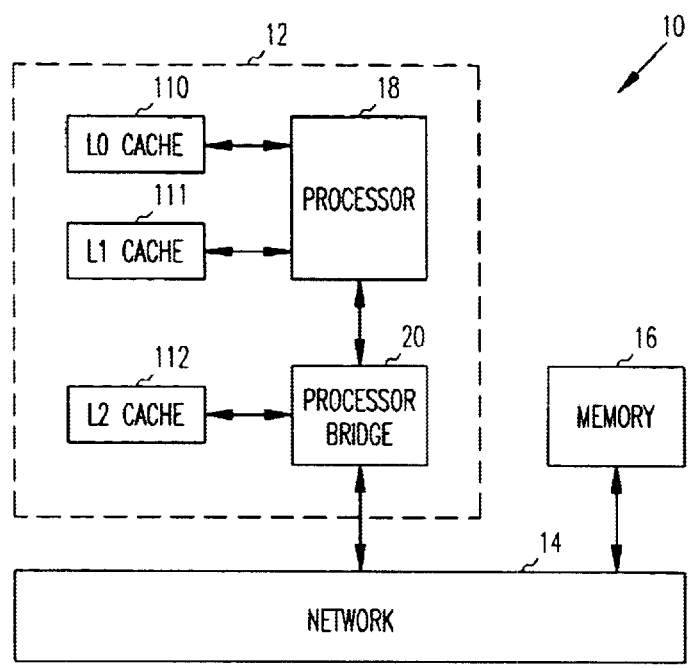
FIG. 1 shows an embodiment of the present invention, a computer system 100.

A computer system 10 in which a microprocessor is retrofitted into a system designed for another microprocessor is shown in FIG. 1. System 10 includes a processor node 12 connected across a network 14 to memory 16. Processor node 12 includes a processor 18 (i.e., the new processor) and processor bridge logic 20.

Figure 15:
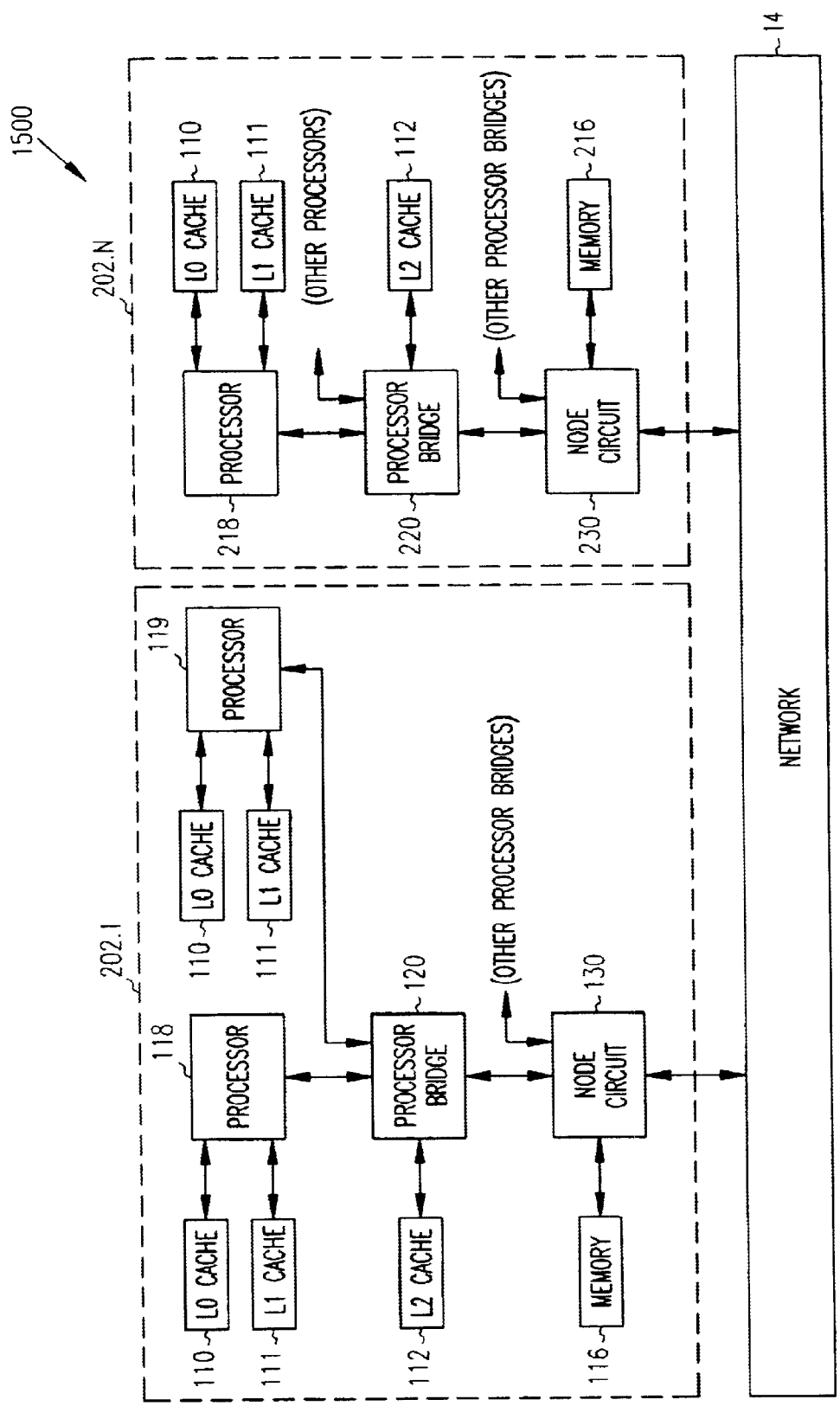
FIG. 15 shows an embodiment of the present invention, a multiprocessor computer system 200.

In some embodiments, processor 18 includes one or more caches (e.g., in one embodiment, level 0 cache 110 and level 1 cache 111—also see FIG. 15), and processor bridge logic 20 includes one or more caches (e.g., in one embodiment, level 2 cache 112). Memory 16 may be a single large memory, or may be distributed as a plurality of smaller memories. In some embodiments, level 0 cache 110 is "on-chip" cache placed on the same chip as the main microprocessor (i.e., processor 18), while level 1 cache 111 is on a separate chip, but in the same module as the main microprocessor. Processor 18 performs read and write operations, typically viewed as operating on or "accessing" data stored in memory 16. Upon an access request, a system cache line (e.g., in one embodiment, a cache line is one hundred twenty-eight (128) bytes) is transferred from memory 16 into level 2 cache 112. In some embodiments, processor 18 has a smaller cache line size (e.g., (64) bytes, in one embodiment), and thus a processor cache line (of (64) bytes) is transferred into level 1 cache 111. In some embodiments, yet another-level of cache (level 0 cache 110) is also provided. In some embodiments, two or more processors 18, each having their own cache(s) are connected to a single processor bridge 20. In some such embodiments, the processors 18 use a snoop-based protocol to maintain cache coherence among themselves, but processor bridge 20 and memory 16 use a directory-based cache coherence scheme.

In some embodiments, caches data is marked as being in one of four MESI states: modified state, exclusive state, shared state, or invalid state. Read-write data is either exclusive state or modified state. Exclusive-state data is read-write data when none of the cache line is yet modified (such data need not ne written back when clean-up is done, since the copy in memory is the same as that in cache), and modified-state is such a cache line once it has been modified (also called a "dirty" cache line, since it must be written back into memory). Only one processor is allowed to have a copy of a particular cache line when it is marked as exclusive-state or modified-state data. When Ad a cache line is purged, that line is marked as invalid state. Shared-state data is considered to be read-only, and a plurality of separate processors and caches can have copies, and no modifications will be written back into memory (in some embodiments, processors may modify their copy of shared, but any modified data is not written back to main memory).

In some embodiments, this allows the purging of shared-state data in the L2 cache 112 once the data requested by processor 18 has been copied into L1 cache 111, since the directory "knows" the data is being used by processor 18 (i.e., the directory can track which processors have copies, or can track the fact that "some" processor has a copy without knowing which processor, and the directory will need send a purge command to invalidate such copies at a later time), and a copy of the relevant data is still in the L1 cache 111. This allows the L2 cache 112 to be freed up to get and hold other cached data into that same cache line space to be used by one of the attached processors 18 (e.g., for the L1 cache of the other processor 18). If the cached data of the first processor is to be changed, then the processor must first get exclusivity to that data by purging all other shared copies (a cache purge request can be sent to every processor in the system, that will in turn perform local front-side bus purge operations to clear all the caches of such shared-state cache copies of data), and requesting an exclusive copy of the data for that processor to modify. The changed data will be written back up the chain (i.e., from the L0 to the L1, and from the L1 to the L2, and from the L2 to the memory. Since, in one embodiment, the processor cache line size is (64) bytes, and the system line size is (128) bytes (i.e., when a cache line is written back to memory 16 from L2 cache 112, (128) bytes are always written), the original (128)-byte system cache line is again fetched from the memory 16 into the L2 cache 112, half is overwritten with the (64) bytes being moved out of the L1 cache 111, and then the changed (128) bytes is written back to memory 16. This frees the (64)-byte cache line in L1 cache 111 and the (128)-byte cache line in L2 cache 112 for other uses.

Figure 2:
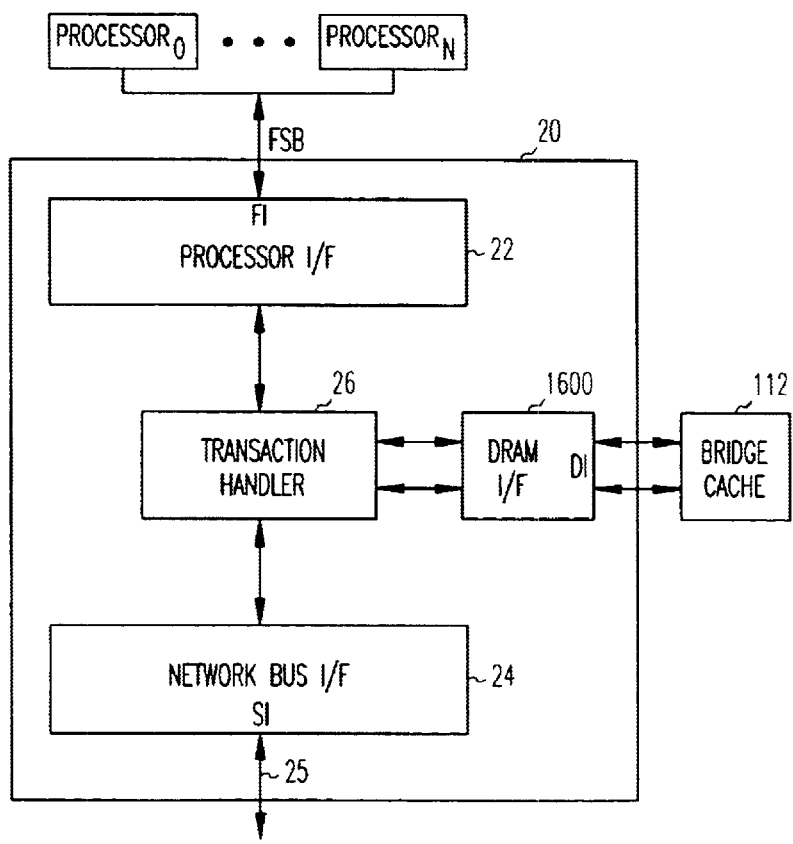
FIG. 2 shows an embodiment of the present invention, a processor bridge 20.

In one embodiment, (as is shown in FIG. 2), processor bridge logic 20 includes a processor interface 22 designed for the new processor (in one embodiment, the processor bus is called the front-side bus (FSB), and this interface is called the FSB interface (FI)), a bus interface 24 which emulates the bus interface of original processor (in one embodiment, the network bus is called the system-side bus (SB), and this interface is called the SB interface (SI)), a transaction handler 26, and a DRAM interface (DI) 1600 connected to a bridge cache 112. In some embodiments, bridge cache 112 of FIG. 2 is the same as, or is used as, level 2 cache 112 of FIG. 1. DI 1600 is further described in FIG. 16 and the corresponding discussion below. Processor interface 22 is capable of receiving memory requests from the new processor and of passing the request to transaction handler 26. Transaction handler 26 receives memory requests from processor interface 22 and transfers the memory requests to memory 16 via bus interface 24. Bridge cache 112 stores data received as a result of a memory request to an address and provides the stored data in response to future memory requests from processor interface 22 to the same address.

Bridge cache 112 acts as a buffer between the transaction regime of the new processor and the transaction regime of the original processor. Bridge cache 112 also provides a fast local copy of a portion of memory to compensate for the fact that the latency to local system memory has effectively increased as a result of the interposing of processor bridge logic 20 as a bus converter.

As noted above, a system which simply interposes a bus converter between the existing structure and the new processor incurs a performance penalty due to the increased latency of the bus converter. By adding a bridge cache 112 of sufficient size, however, system 10 should actually see better performance. That is, the reduced latency of memory requests serviced through cache 112 offsets the increased latency of logic 20.

In addition, by providing bridge cache 112, one can now handle the situation where the cache line size of the new processor is less than the cache line size of system 10. When system 10 returns a cache line, it will be the size of a system 10 cache line. Only a portion of the cache line can be stored to processor 18. The remainder must either be saved in a different storage mechanism, or discarded. (It is usually not possible to write the remaining data directly into processor cache.) Discarding the remaining data wastes a portion of memory bandwidth. In addition, if system 10 is based on a directory-based coherence scheme, the node has no choice but to keep the cache line, because if the line was requested exclusively by processor 18 then, as far as system 10 is concerned, processor 18 now owns that entire cache line. And if bridge logic 20 discards half of the cache line and later has to do a write-back of the cache line to the system, it will need both halves of the cache line to do the write-back. That is a particular problem for systems 10 having a directory-based cache coherency scheme. It would, however, be a difficult problem to solve even in a coherency scheme where bridge logic 20 is bridging a pair of snoopy buses. (There still exists the problem of how to write back a full cache line when only a part of that cache line comes from processor cache.)

In one embodiment, bridge logic 20 forwards the requested partial cache line to processor 18 and stores the remainder in bridge cache 112. For example, if the cache line size of the new processor is half the cache line size of system 10, one can store half the cache line in processor 18 while storing the remaining half in cache 112.

Cache coherence differences can also be an issue in fitting a new processor into an existing system. In one embodiment, transaction handler 26 within bridge logic 20 includes a coherence bridging engine (CE) 30. Coherence bridging engine 30 understands the coherence protocol of both the original processor and of the new processor and serves to bridge between the two coherence protocols. In another embodiment, coherence bridging engine 30 serves as an intermediary between the cache protocol of system 10 and the cache protocol of the new processor.

In one embodiment, bridge logic 20 is designed to support shared memory systems of up to 256 nodes, where each node includes up to four processors 18. Forty bits of physical address bits are used to address nodes and memory such that one terabyte of memory can be addressed. In one such embodiment, the new processor has 44 address bits, rather than the 40 address bits of the original processor. In such an embodiment, predefined address bits (e.g., the upper address bits) are treated as attribute bits, in order to memory map functions to various spaces.

In one embodiment, address bits from processor 18 are mapped so as to provide two views into memory 16 simultaneously with opposite byte orders. One such memory mapping scheme is shown in FIG. 3, where memory is mapped into two spaces and the endianness is handled based on the address space addressed by the memory request. In the embodiment shown in FIG. 3, a driver application can choose to use an address up in the upper version of IOSPEC space or can address the same location through the lower version of IOSPEC.

In one embodiment, bridge logic 20 applies one version of byte and address manipulation in one address space and another in the other address space. There are direct aliases where there can be two of the 44 bit addresses that will map to the same address on a system bus 25, but depending on which one of the aliases is used, logic 20 will handle the data as either little or big endian.

In one embodiment, a massively parallel processing (MPP) system designed for use with a MIPS 12k microprocessor is retrofitted with an Intel Itanium™ microprocessor. One such MPP system is an SN1 manufactured by Silicon Graphics of Mountain View, Calif. The SN1 is a shared memory system in which each node includes four processors and memory. Each node is in turn connected to a network. The processor, memory and network interfaces are described in a U.S. Patent application entitled "MULTIPROCESSOR NODE CONTROLLER CIRCUIT AND METHOD," filed Sep. 30, 1999, the description of which is hereby incorporated by reference.

The SN1 System Architecture specifies a distributed, shared-memory multiprocessor employing up to 4096 processors. SN1 fully supports a single address space and provides cache coherence across the entire machine. SN1 is organized into a number of nodes; each node connects the local memory to the processors, provides a port to the Router Network, and a port to the 10 subsystem.

In one embodiment, each MIPS processor in the node is replaced by an Itanium™ processor connected to processor bridge logic 20. One such embodiment is shown in FIG. 4.

Figure 4:
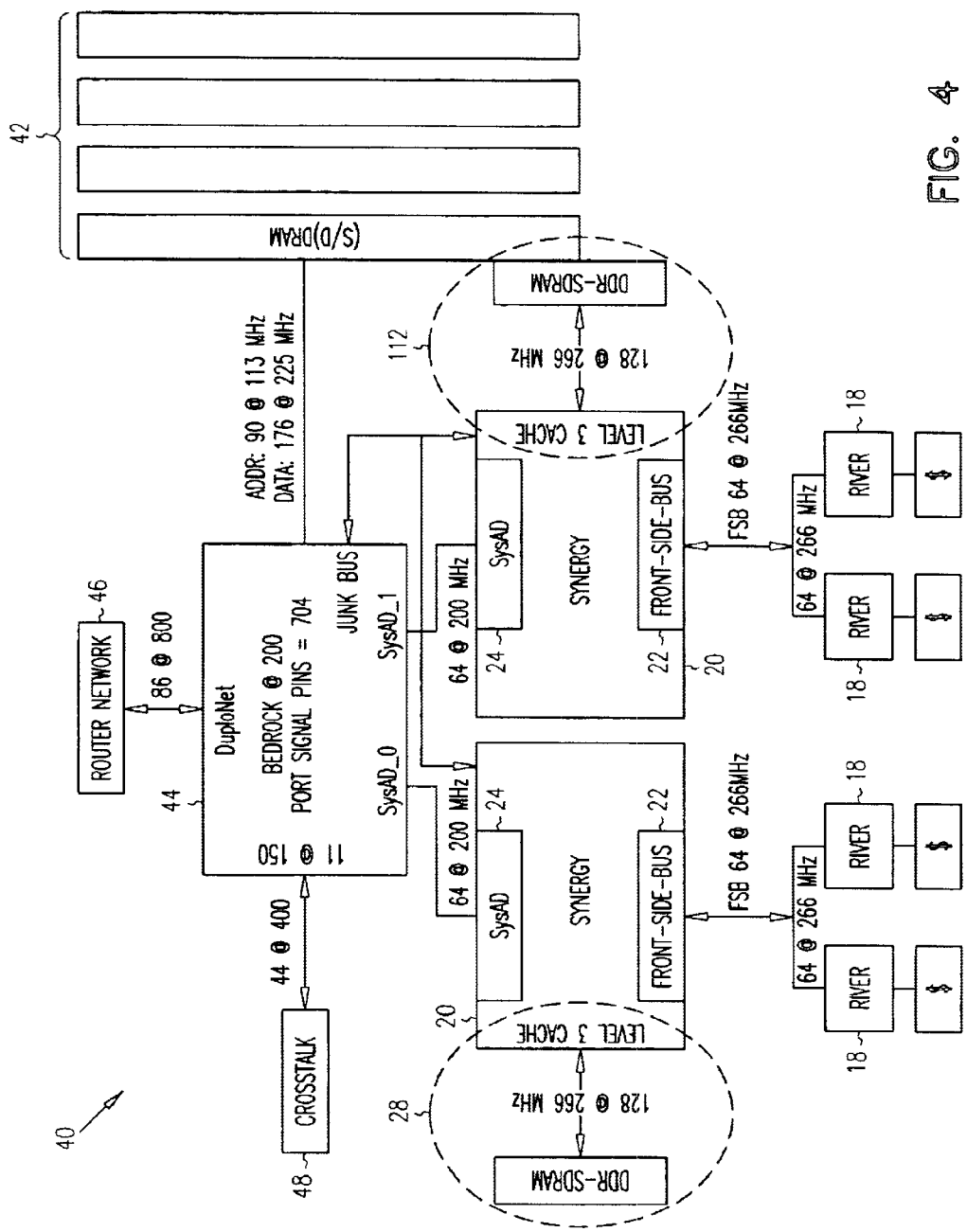
FIG. 4 shows an embodiment of the present invention, a computer system node 40.

In the embodiment shown in FIG. 4, each node 40 includes local memory 42, and a system interface device 44 which connects local memory 42 to processors 18 and which provides a port to Router Network 46 and a port to 10 subsystem 48. In addition, each node includes processor bridge logic 20 which makes processors 18 look like MIPS microprocessors to system interface device 44 while presenting an Intel-like interface to each of the processors 18.

In one embodiment, each bridge logic 20 supports up to two Itanium™ processors, and a (64)-megabyte Level 2 (L2) cache. In another embodiment, each bridge logic 20 supports up to two Itanium™ processors, and a 32-megabyte Level 2 cache. In addition, processor bridge logic 20 can, through device 44, access global memory 16. In one such embodiment, logic 20 also can access the directory which maintains cache-coherence, Crosstalk IO subsystem 48, and the SN1 Net including Router Network 46.

In one such embodiment, bridge cache 112 is implemented within logic 20 via on-chip Tag Random Access Memory (RAM), a Global Coherence Engine (GCE), and a memory interface (DI). Transaction handler 26 adapts processor 18 to the SN1 cache coherence protocol, and combines (64)-byte cache lines into (128)-byte cache lines. The unit of cache coherence for an SN1 system is a cache line of (128) bytes. Bridge cache 112 operates in conjunction with transaction handler 26 to emulate a sub-set of the external interface of the R12K microprocessor, which allows connection into SN1 IO, memory and the network via system interface device 44. Memory-mapped registers (MMRs) that control programmable parameters of the bridge logic 20 are contained in local block 56, which processes access to the MMRs through processor interface 22, and through junk bus 58.

In one embodiment, bridge cache 112 is (64) megabytes in size and 8 way set associative. In one such embodiment, cache 112 is made up of (64)-megabit DDR-SDRAMs, delivering the full bandwidth of the processor bus (FSB).

Figure 5:
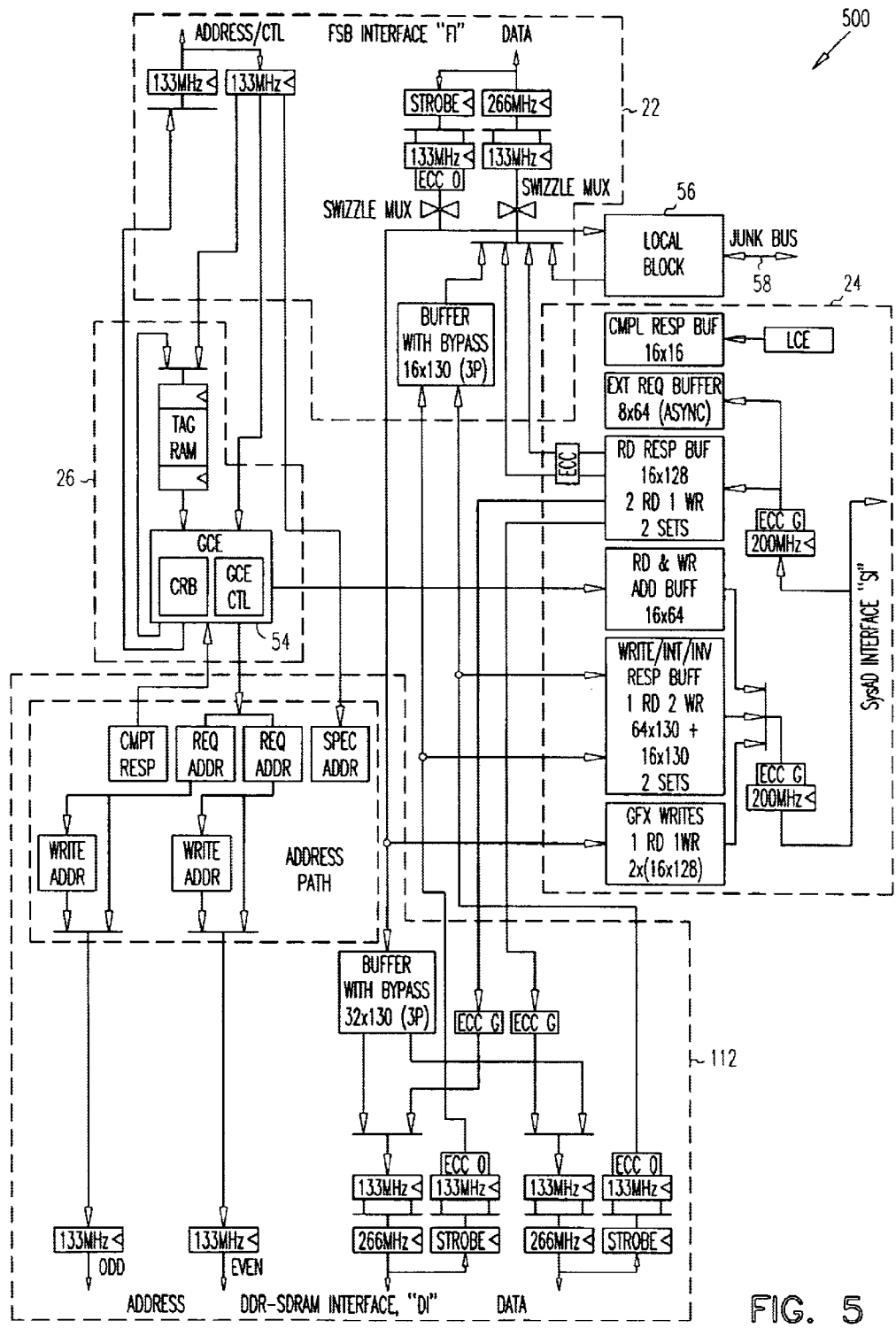
FIG. 5 shows an embodiment of the present invention, address and data paths 50 of processor bridge 20.

FIG. 5 illustrates chip data paths through one embodiment of bridge logic 20. In the embodiment shown in FIG. 5, processor interface 22 includes an address/control bus 50 and a data bus 52. In one embodiment, processor interface 22 is designed to interface with two processors 18 in a cache snooping configuration. This interface supports most request types from processors 18 and is capable of accepting and delivering data to processors 18 at full data bus rate. In one embodiment, it can support up to 16 reads, and up to eight writes from the each processor 18.

Within bridge logic 20, interface 22 communicates with bridge cache 112, bus interface 24, a global coherence engine (GCE) 54 and a local block 56. Bridge logic 20 functional blocks communicate through a set of messages. In one embodiment, all block data transfers are divided into (64)-byte long block transfers. All non-block data transfer are 8 bytes long.

In one embodiment, all transactions from processor 18 are generally serviced out of order. System requests such as interventions (external requests to obtain the status and data of a cache line) and invalidates issued by GCE 54 are issued to processors 18 by interface 22. In one embodiment, interrupts are issued through local block 56 and interface 22 to processors 18.

To achieve high performance, in one embodiment, Tag RAM 60 for bridge cache 112 is implemented on chip. This provides low memory access latency for both cache hits and cache misses and also enables building a high level set associative cache. Since there is limited space on an ASIC for Tag RAM 60, in one embodiment, each entry tags 512 byte blocks, or four sectors of (128) bytes each. Each Tag entry contains state information for its four (128)-byte sectors.

In one embodiment, each sector is composed of two (64)-byte cache sub-lines. In one such embodiment, to reduce intervention traffic the tag for each sub-line contains presence bits used to indicate whether the sub-line is cached by any of the processors 18.

In one embodiment, GCE 54 is responsible for servicing bridge cache misses, bridge cache line replacements, interventions, and invalidates from system. In addition, GCE 54 services uncached reads and writes. It is also responsible for resolving all coherence-related conflicts.

In order to maximize the total number of outstanding requests, resources of both of device 44's processor interfaces {SysAD_0 and SysAD_1} are used. This allows each bridge logic 20 to have up to eight outstanding reads and sixteen outstanding write backs. GCE 54 maintains an entry for each outstanding request.

In one embodiment, the two processors 18 sharing interface 22 snoop requests on the processor bus, and are able to respond to coherent requests. Algorithms implemented in GCE 54 allow this type of coherency to co-exist with the SN1 directory-based coherency. Since the cache line exists in bridge cache 112, system 10 saves an extra trip to the memory/directory of device 44, leading to lower memory access latency for shared data.

In one embodiment, bridge cache 112 keeps a super-set of the processors' internal caches for lines in the Exclusive and Modified states. Although cache lines in the shared state are cached in bridge cache 112, cache replacement algorithms in GCE 54 will replace a line in the shared state without forcing its eviction from caches internal to processors 18.

In one embodiment, local resources and programmable registers of processor bridge logic 20 are software visible through the entire network address space. This is accomplished via the junk bus 58, for remote access. For local access, each local processor 18 is able to access its local resources directly.

In one embodiment, bus interface 24 operates at a frequency of 200 MHz. In one such embodiment, interface 24 uses the flash cycles to support a super-set of protocols tailored specifically to be used with device 44. (Flash cycles are special cycles used for making operations in system interface device 44 visible to bridge logic 20; completion of uncached operations is one of the operations monitored during flash cycles.) Each bridge logic 20 uses all the resources from each SysAD interface 62 of device 44. Thus each bridge logic 20 is able to have up to eight outstanding reads and sixteen outstanding writes. In one embodiment, bus interface 24 implements most of the coherency rules implemented in an R12K processor.

In one embodiment, as discussed above, bridge logic 20 includes support for byte swapping. Via a mode bit selectable at reset time it can be programmed to swap all bytes for cached operations, meaning that it will swap all bytes on cached reads and write backs. For uncached operations, the byte swapping mode is address based, and A43 of the address selects byte ordering of the current request.

To ensure forward progress is maintained, in one embodiment, bridge logic 20 always services replies from interface 24 before servicing requests. Thus cases where a read reply is immediately followed by an intervention, bridge logic 20 will transfer the read reply to the processor before it consumes the intervention.

To prevent deadlocks, in one embodiment, there is a request and a reply virtual channel within bridge logic 20. These two channels are kept independent; all requests, such as reads and writes travel on the request channel. Responses to these requests travel on the reply channel. Before issuing or accepting requests, hardware within bridge logic 20 guarantees that there is reply space available for a new request.

In one embodiment, there are dedicated buffers on bridge logic 20 to receive read replies from system interface device 44. In addition, bridge logic 20 is able to accept speculative replies from system interface device 44. There are also dedicated intervention response buffers connected through bus interface 24 to system interface device 44 in order to break request-request dependencies, or dependencies between write backs and intervention responses.

Since the bridge cache 112 is multi-set associative, to prevent deadlocks, space is reserved for the reply of each request that missed in the cache.

In one embodiment, each processor 18 expects a completion/acknowledge cycle for any outstanding Write. For all external uncached writes to system, bridge logic 20 acknowledges each write once it has been completed. The completion of uncached operations is flagged on bus interface 24 on flash cycles. All uncached accelerated writes (e.g., typically a stream of one-byte writes that are coalesced in bridge logic 20 into cache-line-sized chunks) are acknowledged immediately.

Bridge logic 20 adopts a consistency model wherein all Invalidate and Intervention requests from device 44 are issued in FIFO order. There is no order maintained between non-conflicting cached reads and write backs. Reads that conflict with write backs are held until write backs are issued to device 44. Finally, all uncached operations from processor interface 22 to network 14 are in FIFO order.

Bridge logic 20 contains some amount of hardware to convert a write combining write from processor 18 into SN1 style uncached accelerated writes. It complies to the uncached accelerated write protocol as specified for the R12K.

Any uncached writes to memory, normal uncached writes, that are converted to uncached accelerated writes in device 44, may not be kept in FIFO order with previous uncached accelerated writes issued by processor 18. In one embodiment, bridge logic 20 keeps the uncached accelerated buffer apart from normal uncached writes.

Processor interface 22 will be described next. In the SN1 embodiment discussed above, lines 50 and 52 operate as described in the Intel Itanium™ System Bus Specification. The bus is transaction based, non-blocking (i.e., address and read data can occur out of order), and pipelined.

In one embodiment, processor bridge logic 20 is designed as a replacement to the Intel chipset for the Itanium™ processor. With an Intel chipset, there are partial cache-line read and write cycles which get implicit write backs (when new data is arriving to a cache, an old cache line needs to be freed up for use; write backs are needed to free up a cache line for other data when data in the cache has been modified and thus needs to go back to memory; implicit write backs are those initiated by another processor besides the locally-connected one) of the entire cache-line for a total of two data cycles. One use for such cycles occurs because Intel chipsets perform I/O coherency by presenting all snoopable transactions on the bus; these transactions are often partial cache lines. Partial cache-line write cycles can also occur when the processor caches contain write-through (WT) pages as well as write-back (WB).

In one embodiment discussed above, processor bridge logic 20 does not support this type of transaction because I/O coherency is maintained in system interface device 44. System 10 will, in such an embodiment, support WB, UC (uncached), and WC (write-combining for graphics pipes) and not WT.

In one embodiment, processor bridge logic 20 supports defer requests (needed in the unusual case that a transaction is marked as deferred, but then later has to be retried or has a hard error). It should be noted that Itanium™ processors do not defer; only the IO/memory interface (i.e., processor bridge logic 20 in this embodiment) defers. Processor bridge logic 20 uses the defer phase signal IDS (ID strobe) to present read data on the bus. Bridge logic 20 can prevent conflicts with write data from processors 18 by either determining that no CPU is about to present write data or by stalling a CPU that wants to do so by withholding TRDY.

In one embodiment, processor bridge logic 20 is the only driver of the response bus; processors 18 never drive the response bus.

In one embodiment, processor bus 22 is pipelined and can have up to eight in-order-queue (IOQ in this document) requests active. Many requests can be deferred in the response phase and at that point they are removed from the IOQ, allowing yet more requests to be presented on the bus. There is a DID (deferred ID) number presented in the request phase which, should the request be deferred, is later used to associate the final state of completion of the request (and possibly the data) with the initial request. The DID field is eight bits, although for one embodiment, there are only sixteen deferred requests per CPU 18 (the present encoding of the eight bits is that one bit distinguishes IO/memory requests from CPU requests, three bits are CPU number, and four bits are request number within a CPU).

Read data of all types can be deferred or retried. Write-back (WB) writes cannot be deferred or retried. Uncached (UC) writes and reads can be deferred or retried. When a uncached write is deferred, in one embodiment bridge logic 20 accepts the data before the defer response, but since the response is defer, the requesting processor 18 will know that it is not complete yet.

In one embodiment, bridge logic 20 must always be prepared to accept write data from a WB write request or implicit write back data from a request that started out as a read request. If bridge logic 20 does not have the buffer space or other resources to be able to handle WB write data, it must either get control of the processor bus to prevent new CPU requests or it must stall the WB data. There is a TRDY (target ready) signal to stall the write data, although this action blocks other IOQ requests from progressing past their snoop phases. This is because IOQ[n] must complete its write data phase before it can get to the response phase where it is removed from the in-order-queue (whether or not it is deferred or even retried) and IOQ[n+1] cannot start its data or response phase until that happens. Thus, up to seven IOQs could proceed to their snoop phases, but could proceed no further if TRDY were to be withheld for a long enough time.

Withholding TRDY will not prevent defer phase IDS transactions, so progress can be made on completing deferred reads and writes. Defer cycles can also happen if bridge logic 20 has taken control of the processor bus for the sole purpose of shutting off more CPU requests.

In one embodiment, bridge logic 20 includes a coherent request buffer (CRB) 64 which stores the state for any coherent request. In one such embodiment, bridge logic 20 always defers reads, even for local block access. In addition, bridge logic 20 often will retry reads because of CRB conflicts, among other reasons.

Writes always present their data, even if they ultimately get retried. WB cache line writes and IWB (Implicit Write Back) writes are always completed in the IOQ. UC writes are typically deferred and have VSBL asserted (VSBL asserted means that the write is made visible to the rest of system 10).

In one embodiment, processor interface 22 does a small amount of address decoding to determine byte swapping to support both big-endian and little endian data. It also decodes the request type to determine the amount of encapsulation it provides for the FSB. For instance, some operations (such as interrupt, purge TC, and some status type operations) expect the central agent (which bridge logic 20 is, along with being the memory and I/O interface) to automatically handshake with the response phase on behalf of the symmetric requesters (the CPUs 18). In other cases, processor interface 22 expects the GCE logic to determine the type of response (such as the decision to retry requests). Part of keeping track of when write data from the CPUs 18 might be appearing on the data lines (and therefore when read data cannot be driven back to them) involves remembering the initial type (read/write and zero/non-zero length) of the request as well as the HIT™ status to know when the CPUs 18 are waiting for TRDY. This latter information is needed to know when defer phase operations can occur. (HIT and HITM are used to indicate that one of the processors 18 has the indicated line in cache. HIT™ (hit modified) means that the line in cache has been modified.) In one embodiment, processor bridge logic 20 does not expect to support cached operations smaller in size than a cache line ((64) bytes). This excludes two types of transactions illustrated in the Itanium™ System Bus Specification, namely a partial cache line read or write that includes an implicit write back of the whole cache line.

In one embodiment, the UC/WC/WB/WT attributes are also encoded into the address bits. In such an embodiment, when there is a mismatch of the UC/WC/WB/WT attributes in the attribute field of the request lines vs. the attributes inferred from the high address bits, processor interface 22 modifies its behavior to inhibit write data being pushed, e.g., to the processor interface data buffers. It will also cause a hard error response where possible for the operation and set a status bit.

In one embodiment, processor interface 22 obeys the bus rules as far as LOCK is concerned, although the intended effect will not necessarily take place. In one such embodiment, there is a status signal that can be connected to a local block register to record the fact that a CPU has issued a LOCK.

In one embodiment, processor interface 22 uses the upper address bit to determine how to handle endianness. It remembers this decision from the request phase up through the data phase. In one embodiment, GCE 54 is responsible for remembering the equivalent decision for data out along with the DID for reads.

In one embodiment, GCE 54 does further decoding of the request and determines the response. One example of such an embodiment is shown in FIG. 6, where "GCE determines response" means that GCE 54 does further decoding and determines the response. Since bridge logic 20 is the only driver of the response bus, it always asserts the response; the issue is whether processor interface 22 automatically determines the type of response or whether GCE 54 determines the response type, usually defer vs. retry.

In FIG. 6, the column "generate as master" means that the processor bus logic (as master of the processor bus) drives out this request type, and the column "pass to GCE" means that GCE 54 receives this type of request from processor interface 22 with a valid strobe. The entry "status pulse" means that, while the request type has RBI (request bus interface) IGNORE asserted so GCE 54 does not process it directly, there is a status line to local block 56 so that it may set a status flag.

In one embodiment, GCE 54 communicates with the original issuer of a request by indicating whether the request will be accepted but postponed for a while (defer) or whether it should be reissued (retry). In one such embodiment, these options are communicated with a processor 18 by a bit per possible IOQ. (Because of this, the CRBs in GCE 54 must remember the IOQ_NUM that was initially assigned to a request coming off the processor bus. Processor interface 22 will, in one embodiment, internally set DEFER for all reads and DEFER/VSBL for UC writes.

In one embodiment, processor interface 22 stalls the processor bus when bridge logic 20 runs out of certain resources. In one such embodiment, processor interface 22 simply grabs the bus by asserting BPRI (the bus priority agent) and then holding it. BNR (block next request) is asserted to get to the throttled bus request state in order to space out requests as GCE resources approach the level where they run out. If the STALL_WARN (a warning from the coherence engine to the FSB interface) was not asserted, GCE 54 will assert STALL at the point when it has two left of the most scarce resource. (In such an embodiment, the effect of the BPRI signal allows at least one request after its assertion.)

In one embodiment, bridge logic 20 will issue a number of requests to the processor bus through processor interface 22. For instance, a system intervention/invalidate request requires most of the address bits, down to the system cache line size. In one embodiment, processor interface 22 automatically issues both (64)-byte halves of the (128)-byte request.

In one embodiment, another request, the victim intervention request (a request from the bridge logic cache 112 to the processor to see if the processor's copy of data has been modified), is automatically expanded to the number implied by the sectoring of tag ram 60. In another, the victim intervention request is only expanded for those (64)-byte lines that have their presence bits set.

The interrupt request is another request issued by bridge logic 20 to processors 18. Each interrupt request requires a CPU ID in which a unique number gets set into each CPU 18 in a register.

The deferred request on the request/address bus is required for those CPU requests that were originally deferred, but which now require not the read data or the write completion handshake (which Synergy would have issued via the defer phase), but instead need a hard error or a retry response.

In one embodiment, other available requests include "Purge TC", which issues requests of that name and "FLUSH_REQ", which issues flush cache requests by asserting the FLUSH pin. Bridge logic 20 reviews the number of Flush Acknowledge special operations contained in the FLUSH_NUM_CPUS before it asserts the FLUSH_DONE signal.

In one embodiment, when more than one of the request types is asserted, the priority will be from highest to lowest—e.g., flush, hard-error/retry, interrupt, victim intervention, and SI intervention/invalidate. Once a victim intervention or bus interface intervention/invalidate is started, however, all the sub-transactions are issued as one indivisible operation. Processor interface 22 must be aware that once it gets ownership of the processor bus (FSB), one more request can sneak in and that request may be for part of the system cache line.

In one embodiment, victim and exclusive interventions issue a BIL so that, if neither CPU 18 asserts HI™, the operation simply ends there. A shared intervention will issue a BRL. If a CPU 18 asserts HI™ (i.e., it has the line and it has been modified), an implicit write back will occur; otherwise, bridge logic 20 asserts DEFER in the snoop phase (as it does for all reads), returns a retry response, and simply drops or forgets about the request.

In one embodiment, Global Coherence Engine (GCE) 54 coordinates messages flowing between the main interfaces of bridge logic 20, and manages bridge cache 112. Using bridge cache tag state, outstanding request state, and a coherence table, GCE 54 enforces local processor bus and global SN1 coherence. GCE 54 also manages all bridge logic 20 resource allocation, stalling new requests whenever resources become unavailable due to transactions in progress.

In one embodiment, GCE 54 arbitrates among messages from different processor bus phases, passing each in turn through a pipeline which includes a tag cycle (lookup or update), access to the Coherence Request Buffer block (CRB), and a coherence table lookup. The CRB tracks transactions in progress by allocating an internal resource to each, and maintaining state as to allocated buffers, messages awaited from the other units, etc. Updated CRB state and messages to the other units are generated through the coherence table lookup.

The Global Coherence Engine is described in "Maintaining Cache Coherency between a Bus-Based Snoopy Protocol and a Directory-based Protocol", filed herewith, the description of which is hereby incorporated by reference.

As noted above, bridge cache 112 provides a buffer used to reduce the latency caused by any bus conversion logic. In addition, bridge cache 112 operating with GCE 54 is critical in maintaining cache coherence across a plurality of cache coherence schemes and in handling differences in cache line size.

In one embodiment, a read request to bridge cache 112 that originates from an processor 18 read request causes a completion response that first passes through GCE 54. There it may be delayed before it is presented to processor interface 22 until, for instance, the request has had its response phase on the processor bus. In one embodiment, processor interface 22 includes an eight deep queue for accepting the CE_FI_LRP items (signals from coherence engine to FSB interface for local response).

In one embodiment, bridge cache 112 writes at will to two buffers, one for each of the two banks. Processor interface 22 knows which of the two buffers to read by examining the coherent request buffer address. In one embodiment, processor interface 22 always reads the (64) bytes within a request in the same order (word 0 . . . 3) because bridge cache 112 has placed the data in the buffer in critical word first order (when a cache line of 128 bytes is fetched on the 8-byte bus, the 8-byte doubleword having the data requested by the processor is fetched first, and then the remainder of the cache line is fetched into the cache, in order that the processor's critical data arrives first).

When the defer phase actually occurs on the processor bus, processor interface 22 drives the DID field on the processor bus and returns the CMD and CRB fields to GCE 54 to close out the request.

A read request to bus interface 24 that originates from an FSB read request causes a completion response that first passes through GCE 54. There it may be delayed before it is presented to processor interface 22 until, for instance, the request has had its response phase on the processor bus. In one embodiment, processor interface 22 includes an eight deep queue for accepting the CE_FI_XRP (coherence engine-to-FSB interface external response) items ("coherent read requests": signals from the coherence engine to the FSB interface for external response).

In one embodiment, bus interface 24 writes into a buffer in linear order, undoing the effects of a critical word first request to system 10. In one such embodiment, the address of the buffer is determined by consulting predefined address bits.

When the defer phase actually occurs on the processor bus, processor interface 22 drives the DID field on the processor bus and returns the CMD and CRB fields to GCE 54 to close out the request.

Interrupts generated through device 44 are transmitted through bridge logic 20 to processors 18. In one embodiment, bus interface 24 monitors flash cycles on the SysAD bus to see writes to interrupt bits within bridge logic 20 and also monitors interrupt commands on SysAD 62. It passes this information on to local block 56, which maintains an array of (128) single-bit registers that remember that an interrupt needs to be sent at that level. Local block 56 also includes a priority encoder to pass off a command to processor interface 22 to issue an interrupt at that level on the processor bus. Local block 56 then asserts LB_FI_INTR_VALID (local block to FSB interface interrupt valid signal) with an appropriate LB_FI_INTR_LEVEL to processor interface 22. Processor interface 22, in turn, includes a local block register that associates the LB_FI_CPU_NUM (identifying the appropriate processor) with the destination ID to be driven for the interrupt transaction.

After processor interface 22 finishes issuing the interrupt command on the processor bus, it asserts FI_LB_INTR_DONE for one clock which tells local block 56 that it can issue another request if there are further interrupts to issue.

In one embodiment, bus interface 24 monitors flash cycles on SysAD 62 bus to see writes to two register locations in order to capture the data required for Purge TC operations. As each write-occurs, bus interface 24 asserts SI_FI_PURGE_TC_VALID (a SysAD interface to FSB purge signal) along with the associated data. In one embodiment, the SI_FI_PURGE_TC_CMD has two values, one for the first and another for the second flash locations. When the second location's SI_FI_INTR_VALID occurs, processor interface 22 tries to issue the purge TC transaction. A another SI_FI_PURGE_TC_VALID before the first pair has completed (been issued and TEND has been deasserted) will cause an interrupt and set an error bit.

One embodiment of a bus interface 24 will be described next. In operation, bus interface 24 takes on the role of emulating the original processor. In the SN1 embodiment described above, bus interface 24 takes on the role of an R12k processor and communicates with system interface device 44, which acts as the external agent.

In one embodiment, bus interface 24 accepts requests from the processor interface 22 and transfers them to the SysAD Bus 25 using both sets (SysAD-0 and SysAD_1) of processor resources on the SysAD interface of system interface device 44. For coherent requests (reads and write backs), the address (odd or even (128)-byte cache line) of the request determines which channel the request is issued. For noncoherent requests, channel selection is based upon which processor 18 originated the request.

In one such embodiment, bus interface 24 takes on the role of an R12k processor and communicates to system interface device 44, which acts as the external Agent.

Figure 7:
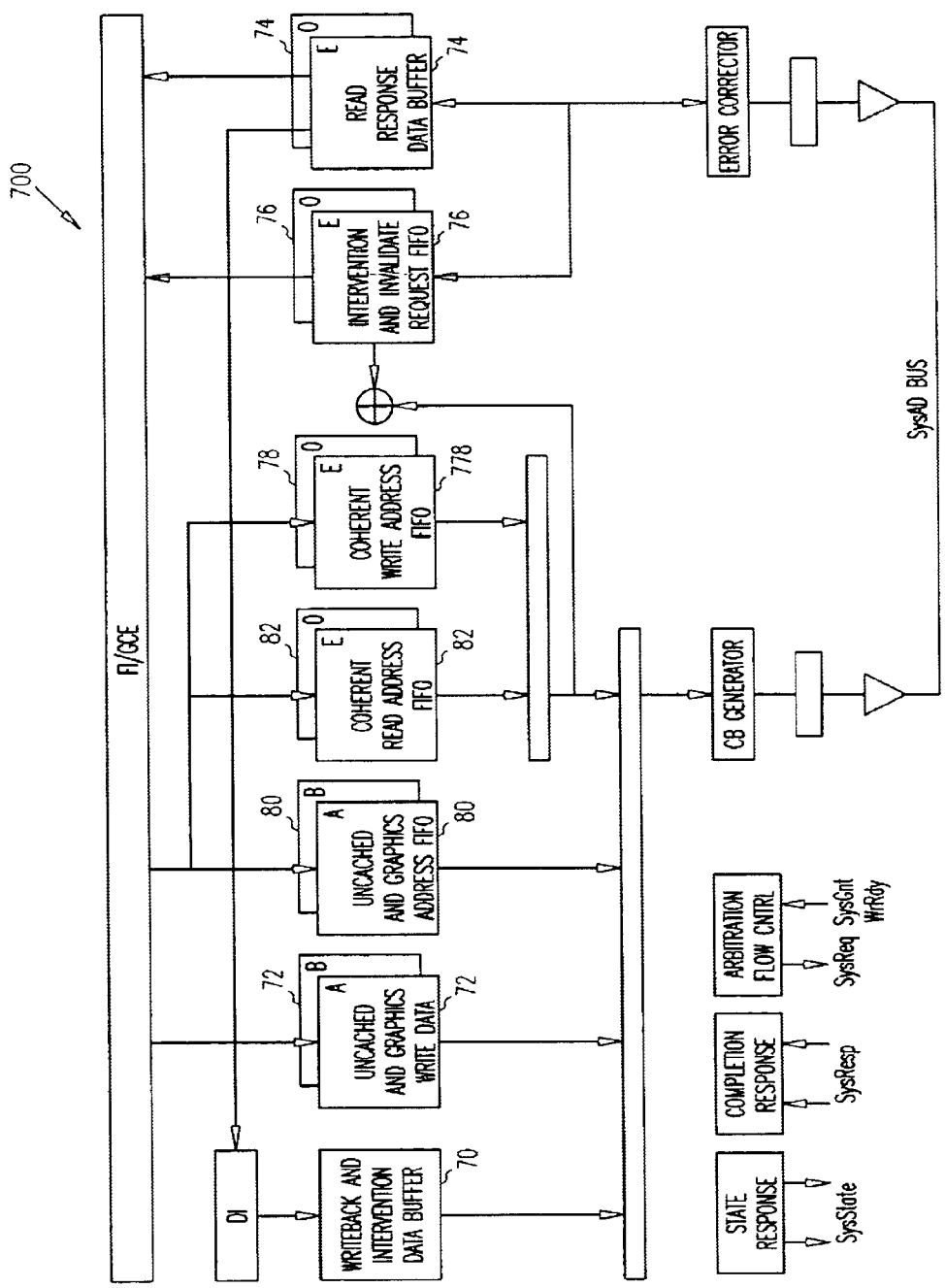
FIG. 7 shows an embodiment of the present invention, system interface 700.

FIG. 7 is a high level block diagram of bus interface 24, and illustrates the main address and data buffers and interconnects. Generally, buffers occur in pairs, corresponding to the two separate channels (Even/Odd and A/B). In one embodiment, bus interface 24 operates within two clock domains, the 133 MHz domain of processor interface 22 and bridge cache 112 and the 200 MHz domain of the SysAD Bus. The address and data buffers provide the boundary between the clock domains through the use of separately clocked read and write ports (i.e., the processor interface and bridge cache connected ports operate at 133 MHz while the SysAD ports operate at 200 MHz).

In one embodiment, bus interface 24 includes three sets of data buffers: the write back and intervention response data buffer 70, the uncached write data buffer 72 and the read response data buffer 74. Address FIFOs 76 and 78 are associated with write back and intervention response data buffer 70. Address FIFO 80 is associated with uncached write data buffer 72 while address FIFO 82 is associated with read response data buffer 74.

Figure 8A:
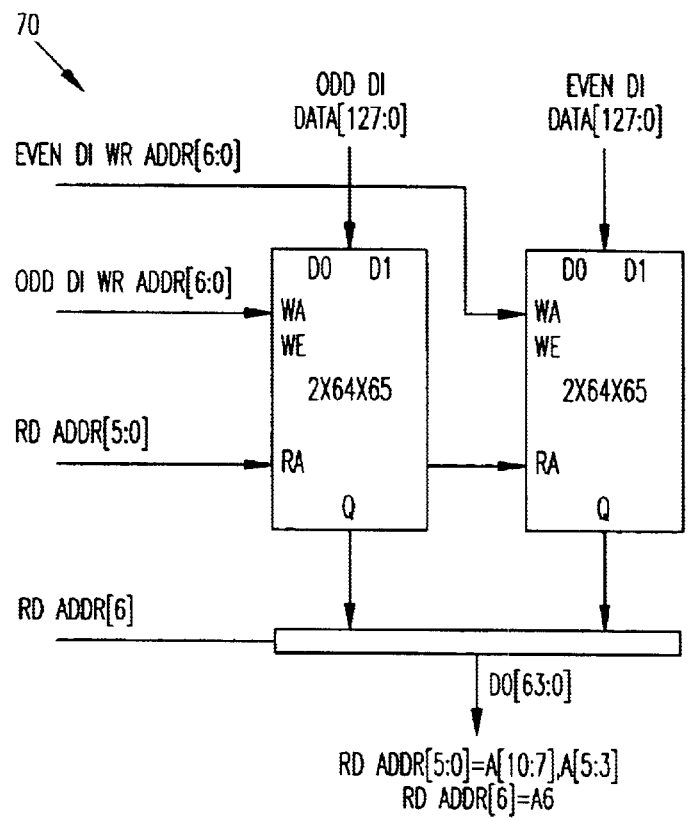
FIG. 8a shows an embodiment of the present invention, writeback and intervention response buffer 70.
Figure 8B:
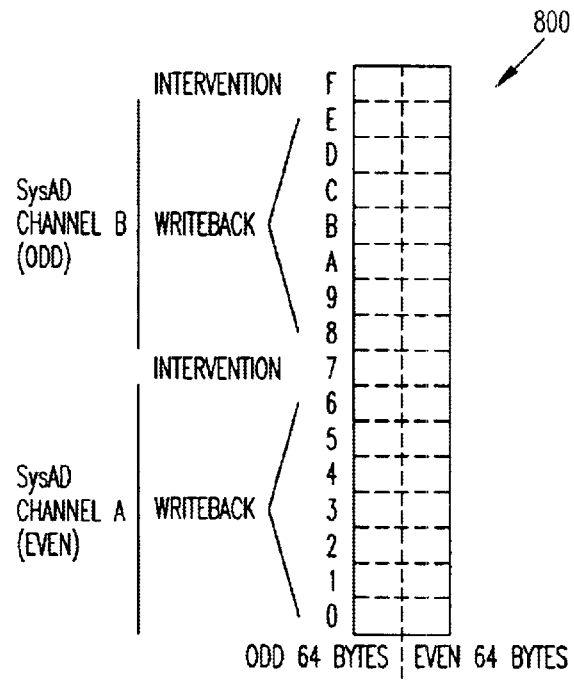
FIG. 8b shows a mapping 800 used by writeback and intervention response buffer 70.

FIG. 8a is a more detailed block diagram of Write back/Intervention Response data buffer 70. FIG. 8b illustrates the amount of data storage contained in buffer 70 (i.e., in (64)-byte bridge cache 112 line quantities). In one embodiment, data buffer 70 is constructed from four 2-port register files. Two register files are used for odd (64)-byte bridge cache lines 90 and two register files are used for even (64)-byte bridge cache lines 92. Together, they allow fourteen (128)-byte system cache lines for write back buffering and two (128)-byte system cache lines for intervention response buffering. In one embodiment, write back and intervention response data buffering are combined into a single ram structure because they share the same read and write data buses and are never accessed simultaneously.

In one embodiment, the odd and even halves of bridge cache 112 have independent write ports. This allows for the two writes to occur in parallel, and therefore simplifies control logic. In one such embodiment, the write logic of the register files operates in the 133 MHz clock domain, while the read logic operates in the 200 MHz clock domain.

In one embodiment, bus interface 24 reads intervention response data in sub-block order. Processor interface 22 and bridge cache 112 write the data in sequential order. Therefore, bus interface 24's read access will not begin until the entire (128)-byte cache line has been written.

Figure 9A:
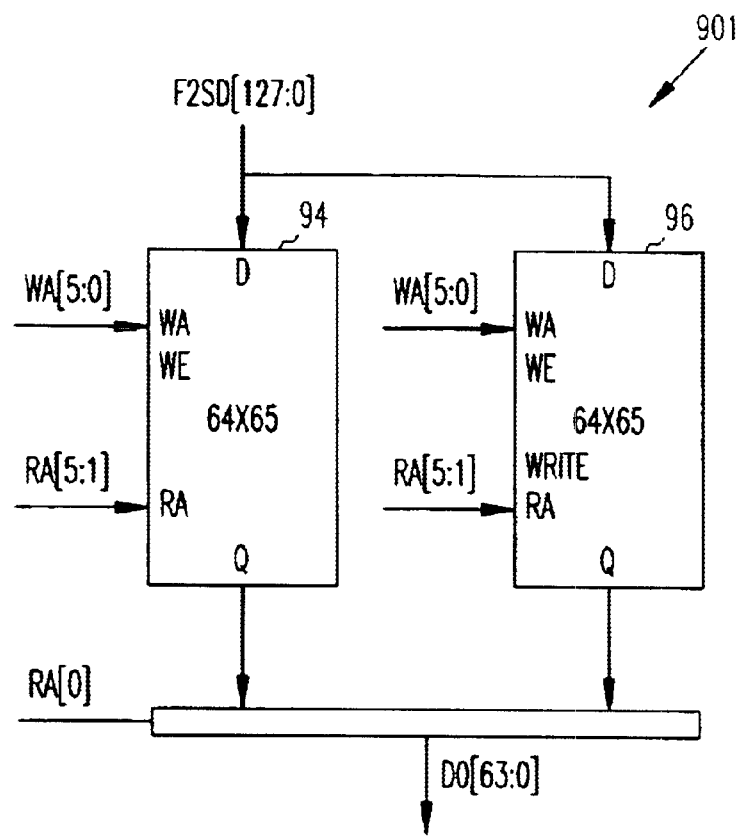
FIG. 9a shows an embodiment of the present invention, uncached & incached accelerated write data buffer 901.
Figure 9B:
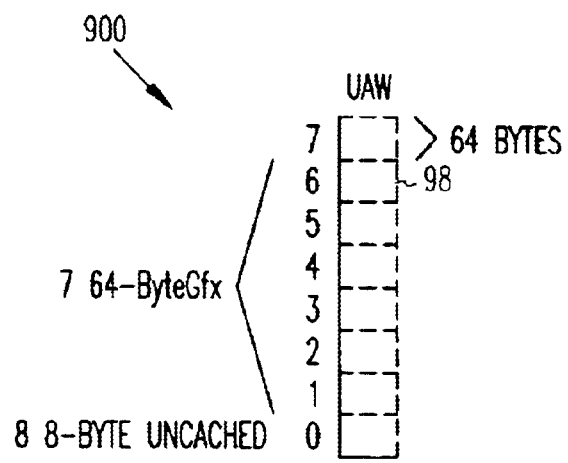
FIG. 9b shows a mapping 900 used by uncached & incached accelerated write data buffer 901.

FIGS. 9a and 9b show details of uncached write data buffer 72. In one embodiment, each processor 18 has its own uncached write data buffer (94, 96). Each write data buffer 72 includes eight (64)-byte sub-buffers 98, where buffers 1–7 are used for gathering WC data and quadword store data, and buffer 0 is used to store the data for up to eight double-word (or less) uncached stores. This function is described in "Use of Deferral as a Flow Control Mechanism", filed herewith, the description of which is hereby incorporated by reference.

Figure 10A:
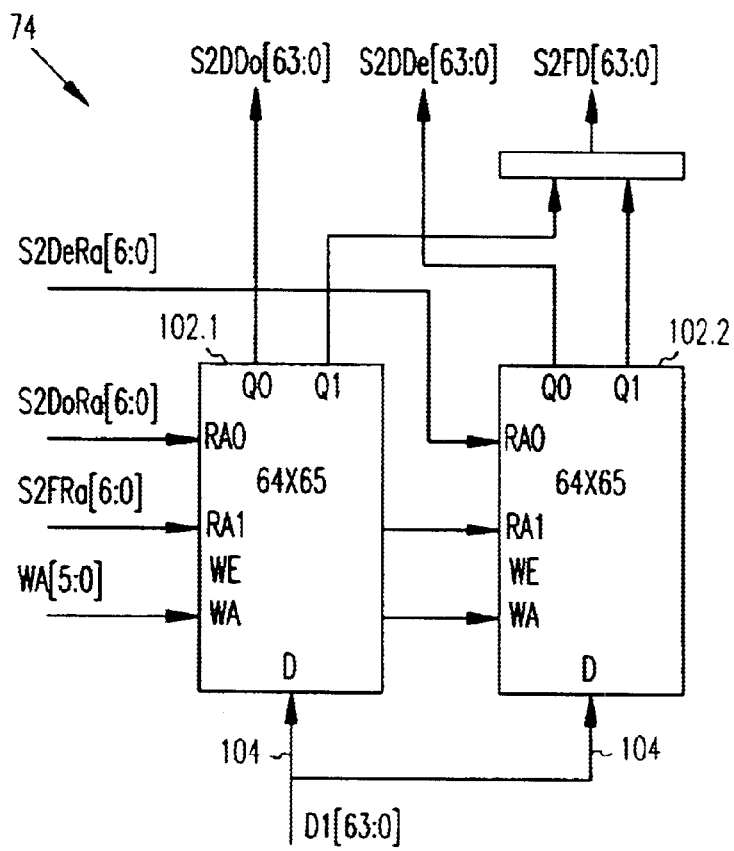
FIG. 10a shows an embodiment of the present invention, coherent read response buffer 74.
Figure 10B:
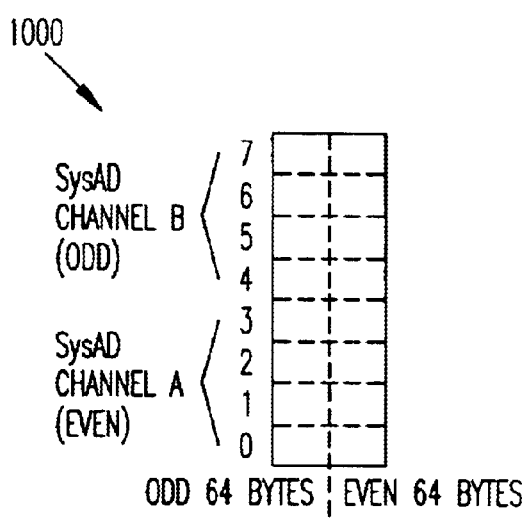
FIG. 10b shows a mapping 1000 used by coherent read response buffer 74.

FIGS. 10a and 10b show the construction of an eight (128)-byte system cache line response buffer (74) built from two 64×65 register files (102.1 and 102.2). Each register file 102 has one write port (D) and two read ports (Q0, Q1). The dual read ports allow processor interface 22 to issue the response to the processor bus independently of bridge logic 20 issuing the refill to bridge cache 112. The read port of register files 102 operate in 133 MHz clock domain, while the write port operates in the 200 MHz clock domain.

In one embodiment, eight block read response buffers are required to absorb the eight read responses associated with the eight possible outstanding SysAD read requests (i.e., four requests per channel). The system coherency protocol allows for cases where two responses result from the issue of a single request (the second will overwrite the first). The block response data is written in sub-block order.

Figure 11:
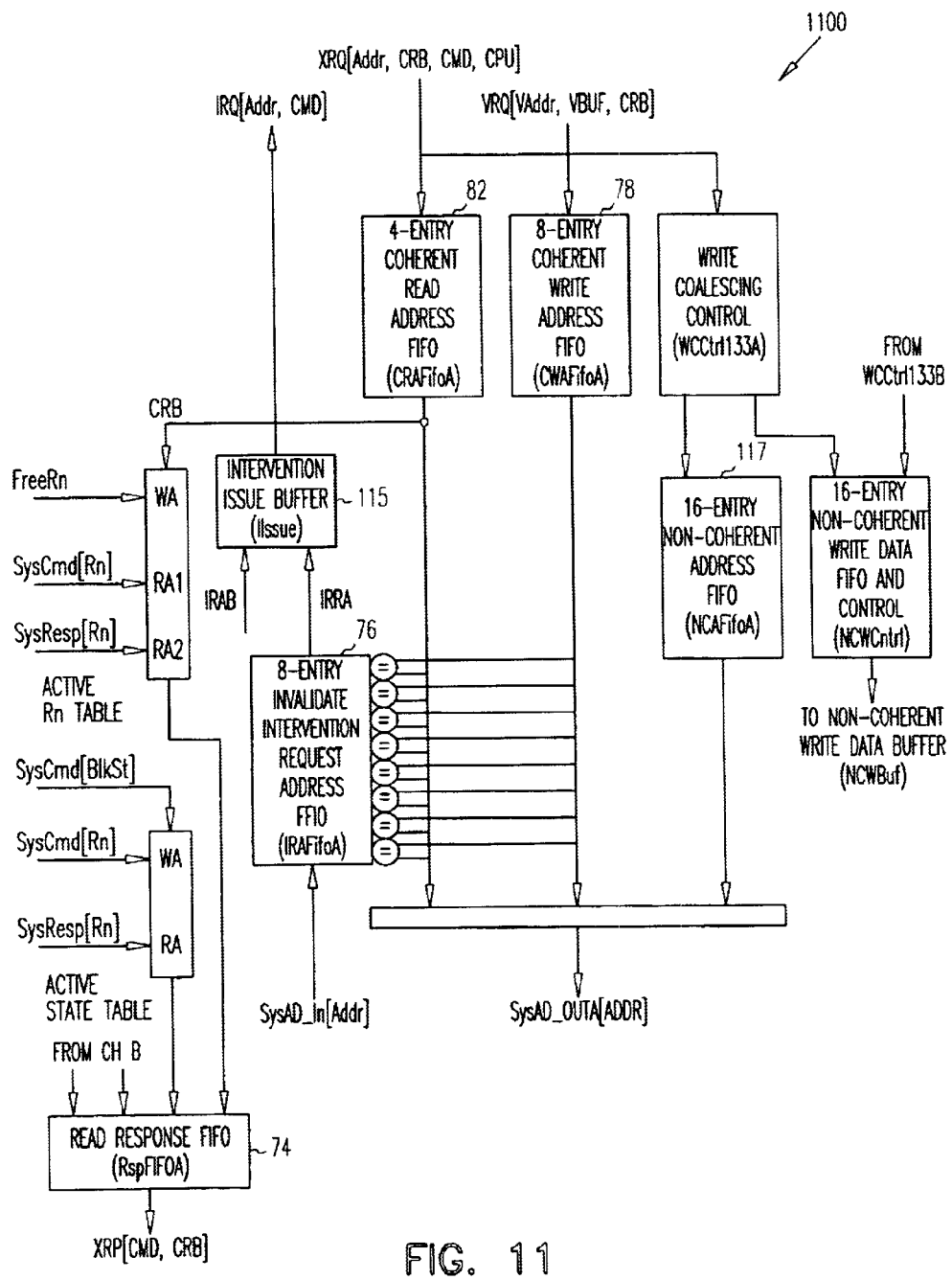
FIG. 11 shows an embodiment of the present invention, coherent address logic 1100.

FIG. 11 shows the major address paths and FIFOs for a single channel. Requests which originate from GCE 54 are placed into one of three address FIFOs. Uncached reads, uncached writes and graphics writes are placed into the 16-entry non-coherent address FIFO 117. Write back addresses are written into the 8-entry coherent write address FIFO 78 and coherent read addresses are placed into the coherent read address FIFO 82. In one embodiment, writing into these address FEFOs occurs in the 133-MHz clock domain.

Requests which originate from the SysAD Bus (intervention and invalidate request) are placed into the eight entry incoming request address FIFO (IRA) 76. The intervention request addresses A and B go to intervention issue buffer 115.

The conflict detection of outgoing coherent read and write request to active IRA entries provide a single point of cache coherency at the SysAD Bus. What this means is that bus interface 24 will not issue conflicting requests onto the SysAD Bus (i.e., issue a read or write back request if an invalidate or intervention is pending).

Intervention and invalidate requests are always sent on to GCE 54. Only one invalidate or intervention, however, will be actively issued to GCE 54 (per channel).

In one embodiment, coherent read requests (matching the odd/even channel address) are placed into a four-entry coherent read address FIFO 82. When coherent read address FIFO 82 becomes non-empty, bus interface 24 acquires bus mastership of the SysAD Bus (unless it is already bus master (i.e., parked)) as soon as there is a free request number available. Once the bus has been acquired (and the IRA is updated from the last incoming request) the read address is checked to determine whether a conflict exists with an active entry in the IRA. If a conflict is detected then a negative acknowledge message (XRSPN) is issued to processor interface 22 and the read request is removed from FIFO 82. If no conflict is detected then the read request is issued (on the SysAD bus) and an entry is made into a table which will cross index the SysAD request number with the CRB issued by GCE 54.

When GCE 54 issues a coherent write request (VBW), the address along with the victim buffer number and the CRB will be placed into coherent write address FIFO 78. Subsequently, transaction handler 26 writes the data into the WI Buffer. When the data is written, data valid bits are set to indicate that the data is available and the SysAD bus transaction can be requested. Once bus mastership is acquired, a final IRA look-up is performed. If no conflict is detected, then the SysAD bus write back transaction is performed, and a VCP (victim complete) message is returned to GCE 54.

If, however, a conflict is detected in the IRA, then the SysAD bus write back transaction is not issued and the VCP will not be issued. The IRB entry will have responsibility for issuing the VCP after a coherent data response (and/or state response) is issued on behalf of the cache line. In this conflict case, GCE 54 returns an IRSPV (intervention response, victim detected).

Note that it is possible for bus interface 24 to receive the VBW and the IRSPV (or IVRSPV) in any order. Bus interface 24 will not, however, issue the coherent data response (on the SysAD) until the IRSPV have been received (even if the VBW is backed up in the coherent write address FIFO). The VCP message is sent to GCE 54 once the coherent data response has been issued (and the write back buffer is re-allocatable) and the VBW has been removed from its FIFO (which may occur at a later time).

In one embodiment, all noncoherent requests are placed in order into 16-entry address/cmd FIFO 117. This corresponds to the maximum allowable outstanding non-coherent transactions of:

8 uncached writes (UCW) double-word or less
7 coalescing writes (WCW) or quad-word uncached writes (UCW)
1 Uncached Read (UC)

When FIFO 117 becomes non-empty, bus interface 24 performs a SysAD Bus transaction as soon as resources are available (i.e., read request number available, WrRdy de-asserted, etc.).

In one embodiment, uncached read requests will be translated into 1, 2 or 8 double/single/partial word SysAD Bus transactions and will contend with higher priority coherent block read requests for the use of free request numbers. For the cases where two or eight partial SysAD Bus transactions (which correspond to (16)-byte and (64)-byte noncoherent read requests, respectively) bus interface 24 issues the requests one at a time. The read acknowledge message will be issued to processor interface 22 after the SysAD response for the last uncached request has occurred.

In one embodiment, uncached write requests are translated into 1 or 2 (for quad-word) double/single/partial word write SysAD Bus transactions.

In one embodiment, coalescing writes are handled in the following manner. WC stores which hit the graphics page are issued onto the SysAD bus as uncached accelerated store block ((128)-byte) or store partial ((64)-byte or less) transactions. Bus interface 24 attempts to gather doubleword WC stores into (64)-byte blocks, and then tries to gather doubleword WC stores into (64)-byte blocks, and then tries to gather (64)-byte blocks into (128)-byte blocks in order to issue (128)-byte uncached accelerated transactions on the SysAD Bus. Uncached writes (double word or less) which hit the graphics page are issued as partial word uncached accelerated SysAD bus transactions after flushing all prior WC transactions (partially gathered) onto the SysAD bus. WC stores which miss the graphics page are issued as uncached writes (doubleword of less) on the SysAD Bus.

All uncached transactions which are not gatherable WC transactions, flush all partially gathered WC transaction onto the SysAD bus (as a series of one or more partial uncached accelerated writes).

In one embodiment, bus interface 24 attempts to gather coalescing writes into (128)-byte SysAD Bus uncached accelerated store transactions. Gathering is performed in two phases. During first phase bus interface 24 attempts to collect multiple 8-byte WC writes into a single (64)-byte write transaction. This is accomplished by means or an "in progress" re-order register, which is opened when a partial WC write occurs and matches the graphics page. Subsequent sequential double-word WC writes to the same (64)-byte block will be merged into a single entry in the graphics address FIFO if all WC writes form a series of sequentially increasing double-word stores.

If an 8-byte WC store is merged at this phase then a WCACK reply message is issued to processor interface 22. When a WC store occurs to an address which does not match the address contained in the re-order register, or if the WC store is not to next sequential double-word, the contents of the re-order register will be flushed to the SysAD Bus.

The second phase of gathering occurs at the output of the graphics address FIFO 80. An attempt is made to consolidate two consecutive (64)-byte block stores into a single (128)-byte uncached accelerated block write. If there is a single even (64)-byte block store in graphics address FIFO 80, a request for the SysAD Bus will not occur until a second valid entry is detected. If, however, a second (64)-byte block write to the odd half of the (128)-byte address is detected, a single (128)-byte uncached accelerated transaction is issued on the SysAD Bus and two WCACK replies are sent to processor interface 22. If the subsequent request is not a full odd (64)-byte block store (with the same (128)-byte address) then the (64)-byte block store is placed on the SysAD Bus as eight separate 8-byte uncached accelerated writes. When the uncached accelerated store(s) have been issued on the SysAD Bus for a particular WC store, the WCACK reply message is issued to processor interface 22 (indicating that further WC store can be accepted).

The write gathering scheme requires that processor 18 place the contents of its write coalescing buffers on the processor bus in program order. This means that the entire contents of one WC buffer must appear on the processor bus before any of the second appears on the processor bus. If a non-full WC buffer is flushed, the multiple partial writes will also need to issue on the processor bus in ascending sequential order (i.e., the same order that they were written).

Both the internal Itanium write gather and the bus interface write gather can be flushed by issuing an uncached st.rel store instruction.

A summary of actions taken for incoming transactions is shown in FIG. 12.

Coherent read responses will be discussed next. In one embodiment, the table used to cross index request numbers is also used to record the state of the cache line included with the SysAD block data response. The block data response is placed into the response buffer corresponding to the indexed request number. The occurrence of a normal completion response (on the SysResp bus) will cause bus interface 24 to send the desired flavor of XRSP message to the processor interface 22 corresponding the recorded cache line state. An error or nack completion response will cause bus interface 24 to send an XRSPE (error) or XRSPN (nack) response to processor interface 22.

Noncoherent read responses will be discussed next. In one embodiment, partial read response data is accumulated into a (64)-byte noncoherent read response buffer. If an error completion response is received then an error response (XRERR) is sent to processor interface 22. Otherwise a normal response message (XURSP_DW, XURSP_QW or XURSP_BL) is sent after all SysAD transactions have completed.

Noncoherent write responses will be discussed next. In one embodiment, the R12000's SysAD Bus does not include a mechanism to acknowledge write requests. In such an embodiment, bus interface 24 issues an UWACK/WCACK to processor interface 22 as soon as the write data has been placed onto the SysAD Bus and the non-coherent write data buffer is available for reuse. It may be necessary for processor 18 to determine if all uncached stores have become globally visible (i.e., system interface device 44 has completed all uncached stores). In one embodiment, software must first issue a non-coherent read to any device 44 register location before reading the GBL_PEFRA/B register, in order to flush out any non-coherent writes in the FIFO.

Inbound SysAD requests will be discussed next. In one embodiment, inbound SysAD Bus intervention and invalidate requests are placed into the channel's eight IRA entries corresponding to the SysAD Bus request number. All intervention and invalidate requests are eventually sent to GCE 54. GCE 54 can, however, accept a maximum of one intervention or invalidate per channel. A request number FIFO keeps track of pending IRB requests which have not been sent to processor interface 22. As soon as the current invalidate/intervention request has completed the next IRB request is sent to processor interface 22.

Usually, invalidate requests are issued across the SysAD Bus as broadcast invalidates (the PI issues invalidates to both channels using SysValA and SysValB on consecutive clocks). When this happens, one of the invalidates is passed to the SysState Bus and not sent to processor interface 22. Only the invalidate which matches with the odd/even channel will be sent to processor interface 22. However, all invalidates will be placed into the IRA FIFO to insure that the state responses on the SysAD are in FIFO order.

Sometimes, however, the invalidate is directed to only one of the two channels. For example, if a processor 18 drops a shared copy of a cache line and then issues a read exclusive to that same cache line, mechanisms in the directory and PI prevent the invalidate from being issued to the originating channel (but not the other channel). This is referred to as a directed invalidate (as opposed to a broadcast invalidate). It is important that directed invalidates be sent to the processor bus and invalidate any shared data which may still be in a processor's cache (a directed invalidate will always miss the bridge cache 112). The directed invalidate will always miss the bridge cache, but the data might be in the processor's caches (if it was shared data in the bridge cache and then replaced in the bridge cache without invalidating the processor's caches). Generally, a directed invalidate occurs when a processor has a read exclusive request outstanding for the cache line which it previously had shared in its bridge cache. A conflict will never occur between a directed invalidate and a coherent read request, because the directed invalidate's address will not match the channel's odd/even address.

Interrupt requests will be discussed next. In one embodiment, an interrupt transaction is used to generate of 5 interrupt bits (per channel). In one such embodiment, bus interface 24 keeps track of a the interrupts with a 5-bit cause register (per channel), which is updated whenever a SysAD Bus interrupt transaction occurs. Bus interface 24 sends these two 5-bit buses to processor interface 22 along with a signal which is asserted whenever any bit changes.

In one embodiment, system interface device 44 is capable of flashing the address and data cycles of all incoming partial write messages (PWR messages to PI local register space). In one such embodiment, bus interface 24 determines when an incoming PWR message is flashing and passes this information to an interface in LB 56.

Outbound SysState responses and SysAD coherency data responses will be. discussed next. In one embodiment, IRSP messages occur in response to intervention requests, while IVRSP messages result in response to invalidate requests. They are similar to the VBW commands because they are issued from both banks of transaction handler 26 and/or processor interface 22, and are sent using the same communication lines (transaction handler 26 will not issue IVRSP messages).

In one embodiment, these commands perform an IRB cycle, using an IRB number, and a subsequent WRB associative look-up, using the address from the WRB. IRSP/IRSPV commands occur in pairs, with the state of the IRB keeping track of both. When the second message is received, a state response is sent to the SysState Bus and a request for the SysAD bus may occur if a coherency data response is required. If a bridge cache 112 victim is in flight (indicated by the IRSPV or IVRSPV messages), then the coherency data response may have to wait for the VBW messages to arrive.

In one embodiment, error handling on bus interface 24 (SI) is handled as shown in FIG. 13. Each error shown in FIG. 13 leads to an Error Interrupt.

A system and method for retrofitting a processor into a system 10 designed for a different processor has been described above. It should be understood that the invention can be applied to one or more processors 12 within a multiprocessor system 200 as shown in FIG. 14.

In the above discussion and in the attached appendices, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

FIG. 15 shows one embodiment of the invention, wherein a plurality of processors 118, 119 . . . 218 (each identical to processor 18 of FIG. 1) are configured in a multiprocessor system. In some embodiments, each processor 118, 119 . . . 218 is an Itanium (™) processor available from Intel Corporation, each having an L0 cache 110 and an L1 cache 111. Each processor bridge 120 . . . 220 is identical to processor bridge logic 20 of FIG. 1, each including an L2 cache 112. A plurality of node circuits 130 . . . 230 are provided, each having its own portion of memory 116 . . . 216, the node circuits being interconnected by network 14.

In FIG. 15, memory 16 is distributed across two or more nodes 202.1 to 202.N Each such node 202 includes a memory (116, 216) connected to a node circuit (130, 230). In one bristled node embodiment, each node circuit (130, 230) is connected to two or more processor bridge logics 120, 220. Each processor bridge logic 220 includes a bridge cache 112 as discussed above. In the embodiment shown in FIG. 15, one processor bridge logic 220 is connected to two processors (118, 119). Each processor includes a Level 0 cache 110 and a Level 1 cache 111. Bridge cache 112 therefore becomes a Level 2 cache. In another embodiment, each processor includes Levels 0–2 cache. Bridge cache 112 therefore becomes a Level 3 cache.

Also shown in FIG. 15, in some embodiments, one processor bridge logic 220 is connected to two or more processors 318. Each processor 318 includes a Level 0 cache 110 and a Level 1 cache 111. Bridge cache 112 therefore becomes a Level 2 cache. In another embodiment, each processor 318 includes Levels 0–2 cache. Bridge cache 112 therefore becomes a Level 3 cache. Other embodiments are also possible.

DRAM Interface

Figure 16:
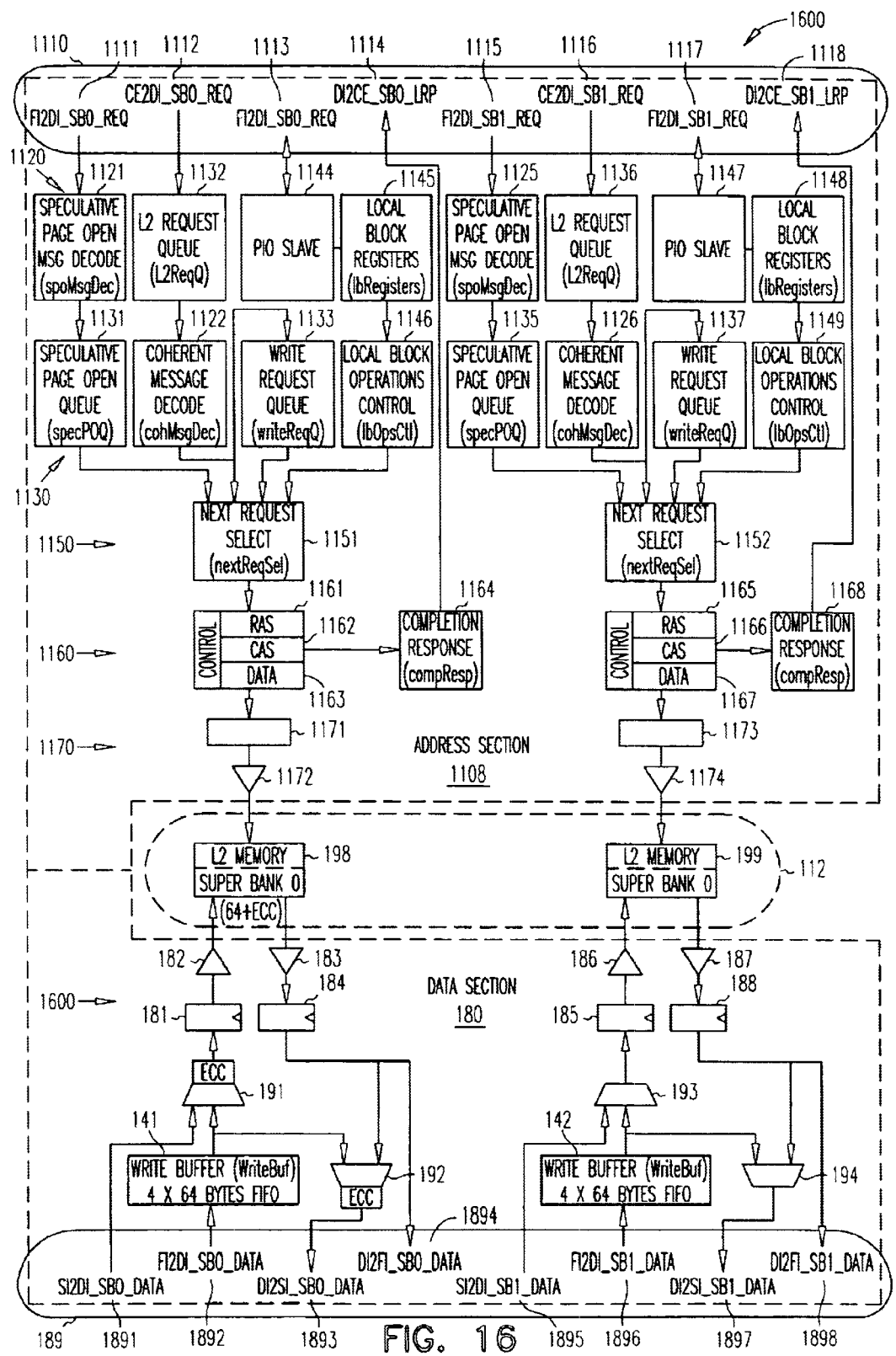
FIG. 16 shows a block diagram of the DRAM Interface (DI) portion 1600 of the bridge chip 20.

FIG. 16 shows a block diagram of the DRAM (Dynamic Random Access Memory) Interface (DI) portion 1600 (described below) of the bridge logic 20 of FIG. 1. The DI 1600 controls reads from the L2 cache 112 (see FIG. 2) and writes to the L2 cache 112 which is stored in off-chip DDR (double-data rate) SDRAM (synchronous dynamic random access memory). The DI 1600 divides the L2 cache 112 into two super banks 198, 199 of 32 MB each and uses an interleave of (64) bytes. The Coherence Engine (CE) of bridge logic 20 considers the DI 1600 to be two resources of 32 MB for (64)-byte transactions, and the CE 30 may issue simultaneously two 20 transactions of different types to each super bank 198 and 199 of cache 112 for a victim read and intervention read, or of the same type for a refill write. The DI 1600 responds to the CE 30 requests by sending response messages to the CE. In addition to receiving and generating messages for requests, the DI 1600 manages buffers for write data associated with FSB requests. Read data destined for the FI (front-side processor interface) 22 or SI (system-side network bus interface) 24 is sent directly to the destination unit, and write data from the SI 24 is read directly from an SI Read Response Buffer.

This section gives both an overview for basic DI operation and detailed information on the architecture and blocks. The overview section covers the following topics:

Message Interfaces 1120
Request Queues 1130
Next Request Select 1150
DRAM Control 1160
Data Section 1180

The architectutre section covers issues outside the core DI operations such as address layouts, local block operations, testing, and initialization. The architecture section, covers features for local block operations (ECC scrubbing, DRAM initialization, DRAM testing) and briefly explains the flow of those operations. The detailed sections go through information on all the blocks: the Request Queues, Next Request Select, DRAM Control, and Data Section.

Conceptually, the DI 1600 is divided into two sections: address section 108 devoted to address processing and data section 180 responsible for data processing. The DI 1600 contains two super banks of DRAM, and each super bank 198 and 199 of cache 112 has separate request queues, address processing, and data processing. In addition, the super banks 198 and 199 of cache 112 operate in parallel.

This description section goes through an overview of the major features of the design shown in the FIG. 16. First, an explanation of the interface to the address section—the message interfaces with CE 30 and FI 22—is given, and the descriptions follow the address flow as it proceeds through the blocks of the address section. Next, the interfaces to the data section are explained, and a brief description of the data section concludes this overview.

Message Interfaces

The CE 30 considers the DI 1600 to be two resources of (32) MB for (64)-byte transactions and passes requests into the DI 1600 using suitable messages. The CE 30 and DI 1600 use two separate interfaces to communicate messages to the two super banks 198 and 199 of cache 112 Victim reads may issue one or two (64)-byte transactions at one time using the two-super-bank interface, and the two reads represent a continuous sector of an L2 cache line. Similarly, refill writes always issue two (64)-byte transactions at one time. The DI 1600 responds to the CE 30 requests after completing operations using suitable messages.

Two channels of incoming messages are received from the CE. Processor read or write messages are sent to one or the other super bank (198 or 199) based on the address interleave by the CE. Victim reads can be sent to either both of the super banks 198 and 199 of cache 112 or one or the other bank. Refills are sent to both super banks 198 and 199 of cache 112 because these requests affect two (64)-byte chunks. All requests go into the L2 Request Queue 132/136 for the bank of a request. In addition to the coherent requests, the FI 22 can send speculative page open requests over separate incoming message channels. These requests are decoded by speculative page-open message decode blocks 1121 and 1125 and placed in one of the separate buffers (speculative page open queues 1131 and 1135) for each super bank 198 and 199 of cache 112.

Two channels are implemented from the DI 1600 to the CE 30 for completion responses from each super bank 198 and 199 of cache 112. L2 coherent reads, block writes, refills, uncached reads, and uncached writes generate completion notices that are sent to the CE. However, data for intervention responses and victim read responses is sent to the SI 24 where the SI 24 returns completion responses, and therefore, the DI 1600 does not return responses for these requests.

Message Decode

A pre-decode is performed on speculative page open requests in the Speculative Page Open Message Decode (spoMsgDec) 1121 or 1125 prior to the Speculative Page Open Queue (specPOQ) 1131 or 1135. Similarly, a pre-decode is performed on L2 requests in the Coherent Message Decode (cohMsgDec) 1122 or 1126 after the L2 Request Queue (L2 ReqQ) 1132 or 1136.

Request Queues

The DI 1600 contains three request queues (1131, 1132, 1133 for super bank 198, and 1135, 1136, and 1137 for super bank 199) and one data buffer (1141 for super bank 198, and 1142 for super bank 199) for each super bank of DRAM 112.

The Speculative Page Open Queue (specPOQ) 1131 or 1135 is fed speculative page open messages from the FI.

The L2 Request Queue (L2 ReqQ) 1132 or 1136 is fed from the CE. Processor reads are placed in the L2 ReqQ with victim reads, intervention reads, refills, and block writes. Some victim reads and all refills actually need to retrieve two contiguous (64)-byte chunks, so these messages are sent to both super banks and are added to queues in both super banks (the two (64)-byte portions of victim and intervention reads are received independently).

The writeReqQ 1133 or 1137 provides a small 2 entry buffer to cluster write transactions, refills and block writes. All write entries are automatically inserted into the writeReqQ from the front of the L2ReqQ unless the writeReqQ is full. In such a case, the writeReqQ is flushed out to DRAM by the Next Request Select (nextReqSel) logic described below, and then the nextReqSel logic moves the write entry from the L2ReqQ to the writeReqQ. If a read request at the front of the L2ReqQ indicates that it possibly conflicts with an outstanding write, then again, the nextReqSel logic flushes all writes from the writeReqQ. This blocking and flushing process is called conflict blocking in the rest of this section.

The Write Buffer (writeBuf) 1141 or 1142 implements a FIFO for block writes from the FI 22 to the DI.

The following table lists the number of entries for each queue, and what resources a queue matches. The CE 30 matches the number of messages installed in each of the queues and the number of data buffers available simultaneously, and the CE 30 knows it can issue another request when the DI 1600 acknowledges a request and, for reads, the data is consumed. For instance, the L2ReqQ contains one entry for each of the 8 FRB refill requests per each super bank, and the CE 30 can send a refill request for each of the SI Read Response Buffers. When the DI 1600 sends a completion response for the refill, the CE 30 can reuse the FRB.

DI Queue Entries

| Queue | Entries per super | Matching Resource |
| --- | --- | --- |
| specPOQ | 1 | None |
| L2ReqQ | 32 | Exceeds the total of: 4 RRB read requests per super bank, 8 VRB victim requests per super bank, 2 IRB intervention requests per super bank, 8 FRB refill requests per super bank, and 4 WRB write requests per super bank |
| writeReqQ | 2 | None |
| writeBuf | 4 | WRB write requests per super bank |

Next Request Select

The nextReqSel logic 1151 or 1152 attempts to process read requests before write requests, but the CE 30 requires conflicting read-to-write requests be done in order. The CE 30 communicates ordering through fields in the request message when it detects a conflict. The conflict fields of the message indicate that a request must flush all preceding writes to the same super bank before issuing the request in the message. Therefore, all writes are executed before the conflicting read. The cases when a read chases a write are created from a processor or victim read following a block write or refill to the same (64)-byte chunk (PBRL/PBRIL/VBRIL to BW/RFL). The block write can be generated by a writeback (WB) or implicit response (for any PBRL or PBRIL), and the refill is generated by an external response (XRSPS, XRSPE, or XRSPM).

All different request types must meet certain eligibility requirements for issue. A speculative page open request can be issued when the DI 1600 receives a request. A read request can be issued as soon as the read message is received and all writes or refills blocking the request are issued. In order to issue a write request, a write request must be received and the DI Write Buffer must contain a full (64) bytes. Finally, a refill request must be received and the appropriate (64)-byte section of the SI Read Response Buffer must be complete.

The first step in request selection determines if there is an eligible request at the front of the request queues, L2ReqQ, specPOQ, and writeReqQ. The selection of an eligible request from the front of a queue is done with a variable priority system, and each super bank independently processes selections using its own set of queues. In normal operating mode, the following priorities are used:

1. Refresh Signal
 2. Local block operations from lbOpsCtl
 3. Read Request from L2ReqQ
 4. Speculative Page Open Request from specPOQ In this mode, write requests at the front of the L2ReqQ are automatically inserted in the writeReqQ. The refresh signal is set whenever the refresh counter expires indicating a refresh is necessary.

If writeReqQ resources are exhausted and another write is at the front of the L2ReqQ, the request priority changes to flush all writes from the writeReqQ. After flushing all writes in the writeReqQ, the request priority changes back to normal, and write are inserted in the writeReqQ. Also, a read at the front of the L2ReqQ if the read message indicates it could conflict with an outstanding write causes a flush, or a timeout from the Write Timeout Counter (WTC) causes a flush. The WTC guarantees that writes do not sit in the writeReqQ indefinitely. In the write flushing mode, the following priorities are observed:

1. Refresh Signal
 2. Local block operations from lbOpsCtl
 3. Write Request from writeReqQ Once all writes are flushed from the writeReqQ, the priority level goes back to the normal operating mode.

A new request is selected when the DRAM control signals it can start processing a new request. Once selected by the nextReqSel logic, the information for the selected request is sent to the DRAM control block and is removed from the request queue.

DRAM Control

Similar to the request queues and nextReqSel logic, separate control blocks are used for the different super banks of DRAM. A DRAM control block takes requests issued by the nextReqSel logic, generates commands to read or write data to the DRAM, coordinates reading or writing data buffers, and signals completion of requests. The DRAM control is divided into three blocks to perform the above functionality: RAS Control, CAS Control, and Data Control.

Requests from the nextReqSel logic start in the RAS Control block. This block determines if and when a new request should issue a command that affects bank states or requires a certain bank state: RAS, precharge, refresh, and mode register set. The following information affects the decision of whether a command is needed and when a command should proceed: type of next request, bank of next request, page of next request, type of current request, bank of current request, page of current request, cycles since last issued command, cycles a page has been held open, and precharge command status. The type of the next request, the type of the current request, and the results of comparisons between the banks and pages of the next and current request separate requests into categories of requests that require different timings and different commands (e.g., mode register write commands do not need a RAS). Counters to keep track of the number of cycles since the last issued command and number of cycles a page has been held open allow the control block to determine when timing restrictions are met. The precharge command status also affects command timings because the occurrence of a precharge is an intermediate step in issuing a DRAM command for the next request.

The CAS Control block receives requests from the RAS Control block, issues CAS commands to the DRAM and signals message completions to the CE. The CAS control waits for the CAS timing restrictions before issuing a CAS command for a request. Once a request meets this requirement, the CAS control sends a completion notice to the CE.

The Data Control block receives requests from the CAS Control block and provides control for the appropriate data buffers.

Page hit optimization is not required for stride-1 processor read performance, but will allow requests following a speculative page open to use the open page and could help with victim reads which might have back-to-back (64)-bytes reads.

Data Section

While the address section processes requests and sends completion responses, the data section collects and passes data going to and from the DRAM. The write data from the FI 22 writes into the DI Write Buffer in a FIFO manner, and the DI 1600 keeps track of the complete lines collected. This information is used by the nextReqSel logic to determine if a block write can be issued. The refill data is obtained directly from the SI Read Response Buffer and does not have a buffer in the DI. Data leaving the DI 1600 is pushed directly into the FI Read Response Buffer on the way to the FSB, or data goes directly to the SI Writeback and Intervention Buffer. Read data is stored in the outgoing read buffers based on the request tag, and the FI 22 may retrieve the data from these buffers using this tag.

The Data Section 180 also includes ECC-generating and -checking mechanisms. The DI 1600 uses the same ECC scheme as the FSB. However, the DI 1600 needs to regenerate ECC for data from the FI 22 when the DI 1600 reads data from the Write Buffer and writes the data into the DRAM. The regeneration is necessary because the DI Write Buffer does not store the ECC code from the FSB transaction. Of course, ECC for data from the SI 24 must be regenerated. When data is read from the DRAM, the data is checked for ECC errors and optionally corrected.

Architecture

The architecture section covers issues outside the core DI operation such as access characteristics, address layouts, local block operations, DRAM and DI initialization, and DRAM testing. The last section describes the errors detected by DI 1600 and the actions taken by DI.

DRAM Access Characteristics

The following table presents the DRAM access penalty for back-to-back operations to the same bank/same page, same bank/different page, and different bank.

| Access | Penalty (133 MHz cycles) | | | |
| --- | --- | --- | --- | --- |
| | Read→Read | Read→Write | Write→Read | Write→Write |
| same bank/same page | 0 | 5 (~3 in other embodiments) | 2 | 0 |
| same bank/different page | 6 | 6 | 9 | 9 |
| different bank | 0 | 5 (~3 in other embodiments) | 2 | 0 |

Layout of L2 and DRAM Addresses

The address for the L2 is specified for a (64) MB eight-way set associative cache with 4 sectors of (128) bytes each sector. The DRAM is organized into two super banks of 32 MB each with a (64)-bit-wide data bus on each super bank, and therefore, the L2 must be divided into two based on a single bit value. Also, the DRAM architecture has a notion of banks and pages with different access times for a request based on whether an address falls in the same bank/different page, the different bank, or the same bank/same page as the previous request. To avoid the higher access times associated with same bank/different page accesses, the DI 1600 interleaves every other (64) bytes in one super bank. This allows the DI 1600 to overlap sequential accesses without keeping a page open for a same bank/same page access—a timing critical operation for external requests. The DI 1600 could also interleave every other (64) bytes on the internal banks of the DRAM, but this would not allow the DI 1600 to use the lower access times for same bank/same page accesses when performing victim reads—keeping pages open for victim reads is not a timing critical operation.

In addition to the above concerns, a victim writeback from the L2 usually follows a read from the same index of the L2, and the victim will address the same bank/different page of the DRAM if the bank bits of the DRAM overlap the index of the L2. Thus, the read and write combination would produce the worst turnaround penalty: same bank/different page read-to-write. To reduce this effect, part of the tag bits for the L2 are mapped with the address bits used for the internal banks. This mapping skews the accesses with different lower bits of the L2 tags to different banks and reduces the turnaround penalty. The following figure shows the overlapped address layout.

Transaction Flow for Local Block Operations

There are three categories of local block operations necessary for the DI: normal local block register accesses, backdoor DRAM accesses, and DRAM mode register accesses.

Normal local block accesses for the DI 1600 require a local register contents be read or written. These register operations are decoded based on uncached address space reserved for Synergy local registers and are handled separately for each super bank in the PIO Slave and Local Block Registers (IbRegisters) blocks.

Backdoor DRAM accesses affect DRAM state, so they follow the same path as processor accesses. These operations are decoded based on uncached address space reserved for Synergy L2 backdoor access. The major difference between a processor access and a backdoor DRAM access is that a backdoor DRAM access is a (64)-bit access instead of a cache line access. Making these operations follow the same paths as processor accesses requires additional coherence messages to indicate that these messages are (64)-bit accesses. The messages for backdoor DRAM operations use the same CRBs, buffers, and credits as normal processor accesses, but the FI 22 and DI 1600 take into account the length of the direct DRAM operations is (64) bits when reading or writing DRAM buffers. In addition, the DI 1600 uses data mask controls to do (64)-bit memory writes. For backdoor DRAM reads, the DI 1600 captures the ECC in the DRAM_BACKDOOR local block register. For backdoor DRAM writes, the ECC can be automatically generated by the DI 1600 hardware, or specified by the DRAM_BACKDOOR local block register.

DRAM mode register reads only require reading the local block registers. DRAM mode register writes write the local block registers and write a command to the DRAM using a similar path as the backdoor DRAM write.

Local Block Registers for DI 1600

The DI Local Block Registers (IbRegisters) contain the following for each super bank:

DI_MEMORY_CONFIG—Specifies DI operation mode

DI_MRS_CONFIG, DI_EMRS_CONFIG—For accessing DRAM MRS/EMRS

DI_REFRESH_CONTROL—Specifies refresh parameters

DRAM_BACKDOOR—For backdoor DRAM ECC access

DI_WRITE_TIMEOUT_CONTROL—Specifies write-Buf timeout parameters

DI_BIST_{CONTROL,STATUS,ADDR,DATA}—For BIST operations

DRAM_UE_ERROR1/2—For uncorrectable error handling

DRAM_CE_ERROR1/2—For correctable error handling

DRAM Initialization

Prior to use, the DRAM must be initialized through a combination of software and hardware described in the following steps. The DRAM of the two super banks may be initialized in parallel.

1. During power-up the L1 System Controller negates the clock enable (CKE) input of the DRAMs to prevent the DRAMs from driving their tristate outputs. After power and clocks are stable, the L1 System Controller waits at least 200 us and before asserting CKE and taking Synergy out of reset.
2. Software performs a DRAM Extended Mode Register Set (EMRS) by performing a PIO write to the DI_EMRS_CONFIG register with the INPROGRESS bit asserted and the VALUE field set to 0x002. This value enables the DRAM DLL and specifies reduced drive for the SSTL2 outputs. Synergy automatically performs the required precharge to all banks prior to updating the DRAM EMRS register.
3. Software waits for the DRAM EMRS to complete by polling the DI_EMRS_CONFIG register using PIO reads and waiting for the INPROGRESS bit to be negated.
4. Software waits at least 200 133 MHz clock cycles for the DRAM DLL to lock.
5. Software performs a PIO to write the DI_REFRESH_CONTROL register with the ENABLE field asserted and the CNT_THRESH field set to 0x0800. This enables DRAM refresh at the proper rate based on a 133 MHz clock cycle.
6. Software waits until at least two auto refreshes have occurred. This requires 32 us based on a 133 MHz clock cycle.
7. Software performs a DRAM Mode Register Set (MRS) by performing a PIO write to the DI_MRS_CONFIG register with the INPROGRESS bit asserted and the VALUE field set to 0x02b. This value specifies a burst length of 8, an interleaved burst type, a CAS latency of 2, and a normal operation mode. Synergy automatically performs the required precharge to all banks prior to updating the DRAM MRS register.
8. Software waits for the DRAM MRS to complete by polling the DI_MRS_CONFIG register using PIO reads and waiting for the INPROGRESS bit to be negated.
9. DI Initialization After initializing the DRAM, the DI 1600 itself must be initialized by software as described in the following steps. The two DI super banks may be initialized in parallel.

1. Software initializes the DI configuration by performing a PIO write to the DI_MEMORY_CONFIG register with the ENABLE_ECC_CHECK_AND_CORRECT bit asserted, the ENABLE_SPO bit asserted, and the COLUMN_ADDRESS_BIT8 bit negated.
2. Software initializes the WTC by performing a PIO write to the DI_WRITE_TIMEOUT_CONTROL register with the ENABLE bit asserted and the CNT_THRESH field set to 0x010.
3. Software clears the DRAM uncorrectable and correctable error registers by writing all ones to the DRAM_UE_ERROR1/2 and DRAM_CE_ERROR1/2 registers.
4. DRAM Testing The DI 1600 supports a Built-In-Self-Test (BIST) feature that can test all of the DRAM (data and ECC) much faster than it could otherwise be accessed. The goal of this feature is to keep as much control as possible in the hands of software, while keeping the speed advantages of hardware testing. The DRAM of the two super banks may be tested in parallel using the following steps.

1. Initialize the DRAM and DI 1600 as described in the previous two sections.
2. Disable ECC checking and correcting by negating the ENABLE_ECC_CHECK_AND_CORRECT bit of the DI_MEMORY_CONFIG register.
3. Perform a BIST write operation to all the DRAM:
4. Initialize the BIST start address by clearing all fields of the DI_BIST_ADDR register.
   5. Initialize the BIST data by specifying the data pattern in the PATTERN field of the DI_BIST_DATA register. This data pattern is replicated across all 72 bits of data and ECC.
6. Specify whether the BIST data pattern should be inverted in alternate cycles by asserting the CYCLE bit of the DI_BIST_DATA register.
7. Specify a BIST write operation by asserting the WRITE bit of the DI_BIST_DATA register.
8. Start the BIST write operation by asserting the START bit of the DI_BIST_CONTROL register.
9. Wait for the BIST write operation to complete by polling the DI_BIST_STATUS register and waiting for the DONE bit to be asserted.
10. Perform a BIST read operation to all the DRAM:
11. Initialize the BIST start address by clearing all fields of the DI_BIST_ADDR register.
12. Specify a BIST read operation by negating the WRITE bit of the DI_BIST_DATA register.
13. Start the BIST read operation by asserting the START bit of the DI_BIST_CONTROL register.

14. Wait for the BIST read operation to complete by polling the DI_BIST_STATUS register and waiting for the DONE bit to be asserted.
15. Check the BIST read operation results by reading the DI_BIST_STATUS register. If the PASSED bit is asserted, no errors were encountered. If the PASSED bit is negated, an error was encountered, and the failure address is captured in the DI_BIST_ADDR register.

A BIST operation may be stopped by software asserting the STOP bit of the DI_BIST_CONTROL register or by hardware if an error is encountered during a read operation. After stopping, the DI_BIST_ADDR register contains the current address. If a BIST operation is restarted, it will continue where it left off.

During a BIST operation, other requests to the DI 1600 should be avoided. Since the local registers are not accessed through the main DI address/data path, they can proceed normally during a BIST operation.

Local Block Interrupts for DI 1600

Each DI super bank 198, 199 can send separate uncorrectable and correctable error interrupts to the local block via the SI.

ECC Scrubbing

Scrubbing on correctable ECC errors is accomplished through a software sequence which flushes the cache line with the error from the L2 cache back to memory:
1. The DI 1600 generates a correctable error interrupt to the local block via the SI 24 which eventually reaches the processor.
2. The interrupt handler reads the DRAM_CE_ERROR1 register to obtain the full physical address and way of the error.
3. Translate the physical address to a virtual address.
4. Issue a Flush Cache Line (FCL) instruction to the virtual address.

Because this sequence of operations is infrequent, the performance impact and latency are not important.

Error Detection and Handling

The following table presents the DI error handling action.

DI Error Handling

| Error | Action |
|---|---|
| Correctable ECC error on data read from DRAM | If ECC checking is enabled, correct the data, update the DRAM_CE_ERROR1/2 registers, and generate a correctable error interrupt to the SI. |
| Uncorrectable ECC error on data read from DRAM | If ECC checking is enable, set the uncorrectable error flag associated with the data, update the DRAM_UE_ERROR1/2 registers, and generate an uncorrectable error interrupt to the SI. |
| Uncorrectable Error Flag on data written to DRAM | Poison the ECC value written to the DRAM. |
| Invalid message received from CE | Ignore message. |

Request Queues

The following sections describe the request queue structures in more detail. The description includes insertion into the queues, the surrounding logic which implements the conflict blocking, and queue contents. First, the interfaces between the incoming messages and request queues are described. The following section adds details on the individual request queues: Speculative Page Open Queue (specPOQ), L2 Request Queue (L2ReqQ), and Write Request Queue (writeReqQ).

Incoming Message to Request Queue Interfaces

The DI interfaces with two incoming message paths: one from the address bus interface portion of the FI 22 and one from the coherence table of the CE. The message path from address bus to DI 1600 directs only one request type, speculative page open requests, to the specPOQ via the spoMsgDec. In contrast, the message path from the CE 30 sends read, refill, and write requests to the L2ReqQ. Because the DI 1600 contains two banks of DRAM, the message paths flow into two different sets of queues based on the interleave for the banks (see Architecture section on address layout for interleave). However, each message queue detects a valid message from a dedicated message interface from the CE.

The interface between the address bus of the FI 22 and the specPOQ is grouped in the Incoming Message from FI 22 to DI group (FI2DI_REQ). This group only needs a valid signal and 14 address bits to communicate the bank and row information necessary for a page open.

FI2DI_REQ—Incoming Message from FI 22 to DI 1600

| Group | Name | Size | Direction |
|---|---|---|---|
| FI2DI_REQ | FI2DI_SB0/1_REQ_VALID | 1 | i |
|  | FI2DI_SB0/1_REQ_ADDR | 14 | i |

The interface between the CE 30 and the L2ReqQ is grouped into the Incoming Message from CE 30 to DI group (CE2DI_LRQ). This group requires a few more signals than the FI2DI_REQ group, such as command, CRB number, VBUF number, address, and way. The command conveys the type of request: coherent read, block write, etc. The CRB number tags the request, so the FI 22 or SI 24 is able to identify completion responses without the address. The address and way information specify the location of the (64)-byte chunk to read or write, and the lower 3 bits of the provided address determine the DRAM burst sequence.

CE2DI_LRQ—Incoming Messages from CE 30 to DI 1600

| Group | Name | Size | Direction |
|---|---|---|---|
| CE2DI_LRQ | CE2DI_SB0/1_LRQ_VALID | 1 | i |
|  | CE2DI_SB0/1_LRQ_CMD | 8 | i |
|  | CE2DI_SB0/1_LRQ_CRB | 3 | i |
|  | CE2DI_SB0/1_LRQ_VBUF | 4 | i |
|  | CE2DI_SB0/1_LRQ_ADDR | 37 | i |
|  | CE2DI_SB0/1_LRQ_WAY | 3 | i |

Speculative Page Open Queue

The Speculative Page Open Queue (specPOQ) holds one page open request from the FI address bus. If a new request is made before issuing the previous request, the new request overwrites the previous request. Besides being overwritten, only issuing a page open request clears the queue.

Format for a SpecPOQ Entry

| Name of Contents | Width | Purpose |
|---|---|---|
| Valid | 1 | Indicates a valid request |
| Type | 6 | Type of request |
| Length | 1 | Access length |
| Flush | 1 | Flush indication |
| Src | 2 | Data source |
| Dest | 3 | Data destination |
| SrcBuf | 4 | Data source buffer |
| DestBuf | 4 | Data destination buffer |
| SBNum | 1 | Super bank number |
| Bank | 2 | Bank |
| Row | 12 | Row |
| Column | 8 | Column |
| Tag | 17 | Tag |
| OrigCmd | 8 | Original CE 30 command |

L2 Request Queue

This section describes the operation and contents of a L2 Request Queue (L2ReqQ). An L2ReqQ entry stores requests for selection by the nextReqSel and allows the nextReqSel logic to selectively read from the queue. Also, the L2ReqQ uses an interface with the CE 30 that is described above to insert new requests into the queue. The L2ReqQ is sized to sink all possible coherent requests from the FI 22 and SI.

The function of the L2ReqQ begins with a valid coherent message. The Incoming Message channel from the CE 30 to DI (CE2DI_LRQ) conveys the new message. For a valid read type, the L2ReqQ writes the message information into the L2ReqQ, increments the queue write pointer on the next cycle, and increments the number of queue entries on the next cycle.

The nextReqSel logic and L2ReqQ interface allows the nextReqSel to select requests without conflicts. The queue read pointer contains the index of the next request up for selection. The L2ReqQ reads the queue contents out so the nextReqSel logic accepts the information if the nextReqSel selects the request. Also, the nextReqSel uses the valid bit and type information for prioritization of request types and for verification of a valid request entry.

Format for an L2ReqQ Entry

| Name of Contents | Width | Purpose |
|---|---|---|
| CMD | 8 | Type of request |
| CRB | 3 | CRB number |
| VBUF | 8 | VBUF number |
| ADDR | 37 | Address consisting of tag, DRAM index, and critical flit |
| WAY | 3 | Addressing for DRAM |

Write Request Queue

This section describes the operation and contents of a Write Request Queue (writeReqQ). The writeReqQ stores pre-decoded write requests for selection by the nextReqSel logic and allows the nextReqSel logic to selectively read from the queue. Also, the writeReqQ uses an interface with the nextReqSel that is described above to insert new requests into the queue from the L2ReqQ. The writeReqQ is sized to accept 2 write requests.

The function of a writeReqQ begins with a signal from the nextReqSel to move a write message from the L2ReqQ to the writeReqQ. For a valid write type, the L2ReqQ writes the pre-decoded message into the writeReqQ, increments the queue write pointer on the next cycle, and increments the number of queue entries on the next cycle.

The nextReqSel logic and writeReqQ interface allows the nextReqSel to select requests without conflicts. The queue read pointer contains the index of the next request up for selection. The writeReqQ reads the queue contents out so the nextReqSel logic accepts the information if the nextReqSel selects the request. Also, the nextReqSel uses the valid bit and type information for prioritization of request types and for verification of a valid request entry. If the nextReqSel logic detects a conflict bit set in the top L2ReqQ entry or the writeReqQ fills up with writes, then the nextReqSel logic uses the number of queue entries to make sure it issues all writes in the writeReqQ.

Format for a WriteReqQ Entry

| Name of Contents | Width | Purpose |
|---|---|---|
| Valid | 1 | Indicates a valid request |
| Type | 6 | Type of request |
| Length | 1 | Access length |
| Flush | 1 | Flush |
| Src | 2 | Data source |
| Dest | 3 | Data destination |
| SrcBuf | 4 | Data source buffer |
| DestBuf | 4 | Data destination buffer |
| SBNum | 1 | Super bank number |
| Bank | 2 | DRAM bank |
| Row | 12 | DRAM row |
| Column | 8 | DRAM column |
| Tag | 17 | Access tag |
| OrigCMD | 8 | Original CE 30 command |

Next Request Select 1150

Each DI super bank 198, 199 contains its own request arbitration logic called the Next Request Select (nextReqSel) 1151, 1152. The nextReqSel chooses from several possible request sources: the Speculative Page Open Queue (specPOQ), L2 Request Queue (L2ReqQ), the Write Request Queue (writeReqQ), and the Local Block Operations Control (lbOpsCtl). In addition, the nextReqSel generates refresh requests based on a refresh counter and selects request using a priority system controlled by several conditions. The first couple of sections explain the nextReqSel counters: the Write Timeout Counter and the Refresh Counter. The next section explains the interface to the DRAM Control logic, and the final section connects the request queues to the DRAM control through the selection logic.

Write Timeout Counter

The Write Timeout Counter (WTC) guarantees that writes do not stay blocked in the writeReqQ for an indefinite amount of time. This feature is necessary if another unit requires a completion response within a defined time limit. The counter is preset to the value specified in the DI_WRITE_TIMEOUT_CONTROL register at reset or whenever a write operation issues, and then begins counting down. If the WTC reaches 0, the WTC asserts a signal that changes the nextReqSel priority to favor writes. In this situation, the nextReqSel will select write if one is available, and the nextReqSel continues to prioritize writes until all the writes in the writeReqQ finish.

Refresh Counter

The Refresh Counter guarantees that a refresh command is issued every (64) milliseconds or less. The counter is preset to the value specified in the DI_REFRESF_CONTROL register at reset or whenever a refresh is issued, and then begins counting down. When the Refresh Counter reaches 0, the nexteqSel changes priority, so a refresh command is issued.

Interface to DRAM Control

The DRAM Control sets a flag when it can accept a new request for its Next Request Register. When this flag is set, the nextReqSel continuously attempts to select another request until the nextReqSel finds a request. When the nextReqSel selects a request, the type, length, flush indication, source, destination, buffer number, bank, row, column, tag, and original CE 30 command are sent to the DRAM Control block. Of course, some requests do not require all of these fields.

Selection Logic

The nextReqSel logic is summarized in the following three tables. The first table defines the inputs and the second table defines the outputs. The third table defines the relationship between inputs and outputs.

nextReqSel Logic Inputs

| Input | Function |
| --- | --- |
| selectNextReqC1 | DRAM Control can accept a new request |
| nextLBMsg_Valid | lbOpsCtl has a valid request |
| nextL2Msg_Valid | L2ReqQ has a valid request |
| nextL2Msg_Type | L2ReqQ command type |
| wrMsgReady | The writeReqQ is not empty and the corresponding data is present in the writeBuf or SI Read Response Buffer |
| passThruMsgRdy | Data is ready in writeBuf for a PASSTHRU message |
| numWrQEntries | Number of valid writeReqQ entries |
| nextSPOMsg_Valid | specPOQ has a valid request |
| flushWrites | Flag to indicate the writeReqQ is being flushed |
| refreshCountExpired | Refresh Counter has reached 0 |
| writeCountExpired | WTC has reached 0 | nextReqSel Logic Outputs

| Output | Function |
| --- | --- |
| selectRefresh | Select refresh message |
| selectLBQ | Select lbOpsCtl message |
| selectL2Q | Select L2ReqQ message |
| selectWRQ | Select writeReqQ message |
| selectSPOQ | Select specPOQ message |
| setRefreshCount | Reload Refresh Counter |
| controlLBQ_RemoveMsg | controlL2Q_RemoveMsg |
| controlL2Q_RemoveMsg | Remove message from L2ReqQ |
| controlWRQ_InsertMsg | Insert message from L2ReqQ into writeReqQ |
| controlWRQ_RemoveMsg | Remove message from writeReqQ |
| controlSPOQ_RemoveMsg | Remove message from specPOQ |
| enterFlushWrites | Enter state to flush write requests from writeReqQ |
| exitFlushWrites | Exit state to flush write requests from writeReqQ |
| setWriteCount | Reload Write Counter | nextReqSel Logic Control Table

| select Next ReqCl | next LB Msg_Valid | next L2 Msg_Valid | next L2 Msg_Type | next L2 Msg_Flush | wr Msg Ready | pass Thru Msg Ready | num WRQ Entries | next SPO Msg_Valid | flush Writes | refresh Count Expired | write Count Expired | Outputs |
|---|---|---|---|---|---|---|---|---|---|---|---|---|
| Refresh | | | | | | | | | | | | |
| 1 | x | x | x | x | x | x | x | x | x | 1 | x | setRefreshCount selectRefresh |
| LB Operation | | | | | | | | | | | | |
| 1 | 1 | x | x | x | x | x | x | x | x | 0 | x | selectLBQ controlLBQ_RemoveMsg |
| Normal Operation | | | | | | | | | | | | |
| 1 | 0 | 1 | READ | 0 | 0 | x | x | x | 0 | 0 | 0 | selectL2Q controlL2Q_RemoveMsg |
| 1 | 0 | 1 | READ | 0 | 1 | x | <2 | x | 0 | 0 | 0 | selectL2Q controlL2Q_RemoveMsg |
| 1 | 0 | 1 | READ | 1 | x | x | ==0 | x | 0 | 0 | 0 | selectL2Q controlL2Q_RemoveMsg |
| 1 | 0 | 1 | READ | 1 | 0 | x | >0 | x | 0 | 0 | 0 | enterFlushWrites setWriteCount |
| 1 | 0 | 1 | READ | 1 | 1 | x | ==1 | x | 0 | 0 | 0 | controlWRQ_RemoveMsg selectWRQ |
| 1 | 0 | 1 | PASS-THRU | 1 | x | 1 | ==0 | x | 0 | 0 | 0 | selectL2Q controlL2Q_RemoveMsg |
| 1 | 0 | 1 | PASS-THRU | 1 | 0 | x | >0 | x | 0 | 0 | 0 | enterFlushWrites |
| 1 | 0 | 1 | PASS-THRU | 1 | 1 | x | ==1 | x | 0 | 0 | 0 | setWriteCount controlWRQ_RemoveMsg selectWRQ |
| 1 | 0 | 1 | WRITE | x | x | x | <2 | x | 0 | 0 | 0 | controlL2Q_RemoveMsg controlWRQ_InsertMsg |
| 1 | 0 | x | x | x | 1 | x | <2 | x | 0 | 0 | 0 | setWriteCount enterFlushWrites selectWRQ |
| 1 | 0 | 0 | x | x | x | x | ==0 | 1 | 0 | 0 | 0 | controlWRQ_RemoveMsg controlSPOQ_RemoveMsg |
| Write Timeout | | | | | | | | | | | | |
| 1 | 0 | 1 | READ | x | x | x | ==0 | x | 0 | 0 | 1 | selectL2Q controlL2Q_RemoveMsg setWriteCount |
| 1 | 0 | 1 | PASS-THRU | x | x | 1 | ==0 | x | 0 | 0 | 1 | selectL2Q controlL2Q_RemoveMsg setWriteCount |

-continued nextReqSel Logic Control Table

| | Inputs | | | | | | | | | Outputs |
|---|---|---|---|---|---|---|---|---|---|---|
| select Next ReqCl | next LB Msg_Valid | next L2 Msg_Valid | next L2 Msg_Type | next L2 Msg_Flush | wr Msg Ready | pass Thru Msg Ready | num WRQ Entries | next SPO Msg_Valid | flush Writes | refresh Count Expired | write Count Expired | Outputs |
| 1 | 0 | 1 | PASS-THRU | X | X | 0 | ==0 | X | 0 | 0 | 1 | setWriteCount |
| 1 | 0 | 1 | WRITE | X | X | X | ==0 | X | 0 | 0 | 1 | controlL2Q_RemoveMsg controlWRQ_InsertL2Msg setWriteCount |
| 1 | 0 | 0 | X | X | X | X | ==0 | 1 | 0 | 0 | 1 | selectSPOQ controlSPOQ_RemoveMsg setWriteCount |
| 1 | 0 | X | X | X | X | X | ==0 | 0 | 0 | 0 | 1 | setWriteCount |
| 1 | 0 | X | X | X | 0 | X | >0 | X | 0 | 0 | 1 | enterFlushWrites |
| 1 | 0 | X | X | X | 1 | X | ==1 | X | 0 | 0 | 1 | selectWRQ controlWRQ_RemoveMsg setWriteCount |
| 1 | 0 | X | X | X | 1 | X | ==2 | X | 0 | 0 | 1 | enterFlushWrites selectWRQ controlWRQ_RemoveMsg |
| Write Flushing Operation | | | | | | | | | | | | |
| 1 | 0 | X | X | X | 1 | X | ==1 | X | 1 | 0 | X | exitFlushWrites selectWRQ controlWRQ_RemoveMsg setWriteCount |
| 1 | 0 | X | X | X | 1 | X | ==2 | X | 1 | 0 | X | selectWRQ controlWRQ_RemoveMsg |
| Default | | | | | | | | | | | | |
| X | X | X | X | X | X | X | X | X | X | X | X | None |

DRAM Control 1160

Similar to the request queues and nextReqSel logic, separate control blocks (161, 162, 163, 164) and (165, 166, 167, 168) are used for the different superbanks (198, 199 respectively) of DRAM. The DRAM control block takes requests issued by the nextReqSel logic, generates commands to read or write data to the DRAM, coordinates reading or writing data buffers, and signals completion of requests. The DRAM control is divided into three blocks to perform the above functionality: RAS Control, CAS Control, and Data Control. The next few sections explore each block in detail.

RAS Control Block 161, 165

Requests from the nextReqSel logic start in the RAS control block. This block determines if and when a new request should issue a command that affects bank states or requires a certain bank state: RAS, precharge, refresh, and mode register set. The following information affects the decision of whether a command is needed and when a command should proceed: type of next request, bank of next request, page of next request, type of current request, bank of current request, page of current request, cycles since last issued command, cycles a page has been held open, precharge command status, and blocked precharge status. The type of the next request, the type of the current request, and the results of comparisons between the banks and pages of the next and current request separate requests into categories of requests that require different timings and different commands (e.g., mode bit commands do not need a RAS). Counters to keep track of the number of cycles since the last issued command and number of cycles a page has been held open allow the control block to determine when timing restrictions are met. The precharge command status also affects command timings because the occurrence of a precharge is an intermediate step in issuing a DRAM command for the next request. The blocked precharge status indicates that an access to the same page of the preceding command successfully blocked precharge on that page, and therefore, the next command can proceed with lower latency because the operation proceeds without a RAS command.

The RAS Control logic is summarized in the following three tables. The first table defines the inputs and the second table defines the outputs. The third table defines the relationship between the inputs and outputs.

RAS Control Block Inputs

| Input | Function |
| --- | --- |
| newNextReq | Flag to indicate there is a new RAS request |
| rasReq_Type | RAS request type |
| nextReadCount | Value of nextReadCount for bank specified by the RAS request |
| nextWriteCount | Value of nextWriteCount for bank specified by the RAS request |
| nextBankCount | Value of nextBankCount for bank specified by the RAS request |
| lastBankCount | Value of lastBankCount for bank specified by the RAS request |
| allNextBankCount | Value of nextBankCount for all banks |
| pgOpenCount | Page open count value |
| spoState | Flag to indicate speculative page open state |
| block_PrechargeState | Flag to indicate block precharge state |
| poHit | Page open hit |
| MRSCount | MRS counter |

RAS Control Block Outputs

| Output | Function |
| --- | --- |
| issuePrecharge | Inform CAS Control to issue Precharge |
| issueRas | Inform CAS Control to issue RAS |
| issueRefresh | Inform CAS Control to issue Refresh |
| issueMRS | Inform CAS Control to issue MRS |
| startCasStaage | Start CAS Control |
| setNextReadCount | Load nextReadCount for RAS request bank |
| setNextWriteCount | Load nextWriteCount for RAS request bank |
| setNextBankCount | Load nextBankCount for RAS request bank |
| setAllNextBankCount | Load nextBankCount for all banks |
| setLastBankCount | Load lastBankCount for RAS request bank |
| setPgOpenCount | Load Page Open Count to 0xff |
| enterBlockPrechargeState | Set Block Precharge State flag |
| exitBlockPrechargeState | Clear Block Precharge State flag |
| enterSpoState | Set Speculative Page Open State flag |
| exitSpoState | Clear Speculative Page Open State flag |
| skipToCas | Skip CAS Control RAS to CAS interval |

RAS Control Block Table

| | | Inputs | | | | | | | | | | |
| --- | --- | --- | --- | --- | --- | --- | --- | --- | --- | --- | --- | --- |
| new Next Req | ras Req_Type | next Read Count | next Write Count | next Bank Count | last Bank Count | all Next Bank Count | pg Open Count | spo State | block Precharge Stage | poHit | MRS Count | Outputs |
| Unoptimized Read or Write Transactions | | | | | | | | | | | | |
| 1 | READ | 0 | X | 0 | 0 | X | X | 0 | 0 | X | X | issueRas<br>startCasStage<br>nextReadCount <= 3<br>nextWriteCount <= 8<br>nextBankCount <= 9<br>lastBankCount <= 3<br>setPgOpenCount |

-continued

RAS Control Block Table

| | | Inputs | | | | | | | | | | |
|---|---|---|---|---|---|---|---|---|---|---|---|---|
| new Next Req | ras Req_Type | next Read Count | next Write Count | next Bank Count | last Bank Count | all Next Bank Count | pg Open Count | spo State | block Precharge Stage | poHit | MRS Count | Outputs |
| 1 | WRITE or PASS-THRU | X | 0 | 0 | 0 | X | X | 0 | 0 | X | X | issueRas startCasStage nextReadCount < = 5 nextWriteCount < = 3 nextBankCount < = c lastBankCount < = 3 setPgOpenCount |
| Block precharge transactions | | | | | | | | | | | | |
| 1 | READ | X | !=0 | X | !=0 | X | !=0 | 0 | 0 | 1 | X | enterBlockPrechargeState |
| 1 | WRITE or PASS-THRU | X | !=0 | X | !=0 | X | !=0 | 0 | 0 | 1 | X | enterBlockPrechargeState |
| 1 | READ | 0 | X | X | X | X | X | 0 | 1 | 1 | X | exitBlockPrechargeState startCasStage nextReadCOunt <= 3 nextWriteCOunt <= 8 nextBankCount <= 9 lastBankCount <= 3 |
| 1 | WRITE or PASS-THRU | 0 | X | X | X | X | X | 0 | 1 | X | X | exitBlockPrechargeState startCasStage nextReadCount <= 3 nextWriteCount <= 8 nextBankCount <= 9 lastBankCount <= 3 |
| Speculative Page Open Requests | | | | | | | | | | | | |
| 1 | SPO | 0 | 0 | 0 | 0 | X | X | 0 | 0 | X | X | enterSpoState issueRas nextBankCount <= 5 lastBankCount <= 2 setPgOpenCount |
| 1 | SPO | X | X | X | !=0 | X | !=0 | 0 | 0 | 1 | X | enterBlockPrechargeState |
| 1 | SPO | 0 | 0 | X | X | X | X | 0 | 1 | X | X | exitBlockPrechargeState enterSpoState startCasStage lastBankCount <= 2 |
| 1 | READ | X | X | X | 0 | X | !=0 | 1 | 0 | 1 | X | exitSpoState skipToCas startCasStage nextReadCount <= 0 nextWriteCount <= 5 nextBankCount <= 6 |
| 1 | WRITE or PASS-THRU | X | X | X | 0 | X | !=0 | 1 | 0 | 1 | X | exitSpoState skipToCas startCasStage nextReadCount <= 2 nextWriteCount <= 0 nextBankCount <= 9 |
| 1 | SPO | X | X | X | X | X | !=0 | 1 | 0 | 1 | X | startCasStage |
| 1 | READ | X | X | X | X | 0 | !=0 | 1 | 0 | 0 | X | exitSpoState issuePrecharge nextReadCount <= 2 nextWriteCount <= 2 lastBankCount <= 0 allNextBankCount <= 2 |
| 1 | WRITE or PASS-THRU | X | X | X | X | 0 | !=0 | 1 | 0 | 0 | X | exitSpoState issuePrecharge nextReadCount <= 2 nextWriteCount <= 2 lastBankCount <= 0 allNextBankCount <= 2 |
| 1 | SPO | X | X | X | X | 0 | !=0 | 1 | 0 | 0 | X | exitSpoState issuePrecharge nextReadCount <= 2 nextWriteCount <= 2 lastBankCount <= 0 allNextBankCount <= 2 |

-continued

RAS Control Block Table

| new Next Req | ras Req_Type | next Read Count | next Write Count | next Bank Count | last Bank Count | all Next Bank Count | pg Open Count | spo State | block Precharge Stage | poHit | MRS Count | Outputs |
|---|---|---|---|---|---|---|---|---|---|---|---|---|
| Page Open Timeout | | | | | | | | | | | | |
| X | X | X | X | X | X | 0 | 0 | 1 | 0 | X | X | exitSpoState<br>issuePrecharge<br>nextReadCount <= 2<br>nextWriteCount <= 2<br>lastBankCount <= 0<br>allNextBankCount <= 2 |
| Mode Register Update Requests | | | | | | | | | | | | |
| 1 | MODE UPDATE | X | X | X | X | 0 | X | 0 | 0 | X | 0 | issuePrecharge<br>setMRSCount |
| 1 | MODE UPDATE | X | X | X | X | 0 | !=0 | 1 | 0 | X | 0 | exitSpoState<br>issuePrecharge<br>setMRSCount |
| 1 | MODE UPDATE | X | X | X | X | 0 | !=0 | 0 | 0 | X | 1 | issueMRS<br>startCasStage<br>nextReadCount <= 1<br>nextWriteCount <= 1<br>lastBankCount <= 0<br>allNextBankCount <= 1 |
| Refresh | | | | | | | | | | | | |
| 1 | REFRESH | X | X | X | X | 0 | X | 0 | 0 | X | X | issueRefresh<br>startCasStage<br>nextReadCount <= 9<br>nextWriteCount <= 9<br>lastBankCount <= 0<br>allNextBankCount <= 9 |
| 1 | REFRESH | X | X | X | X | 0 | !=0 | 1 | 0 | X | X | exitSpoState<br>issuePrecharge<br>allNextBankCount <= 2 |
| Reset | | | | | | | | | | | | |
| X | RESET | X | X | X | X | 0 | X | 0 | 0 | X | X | startCasStage |
| Default | | | | | | | | | | | | |
| X | X | X | X | X | X | X | X | X | X | X | X | None |

CAS Control Block 162, 166

Each CAS Control block receives requests from its RAS Control block, issues CAS commands to the DRAM and signals message completions to the Completion Response (compResp) block. The CAS Control waits for the CAS timing restrictions before issuing a CAS command for a request. Once a request meets this requirement, the CAS Control starts the Data Control block and sends a completion notice to the compResp block. The compResp block is responsible for generating the needed response message and sending the message directly to the CE.

The signal for starting the CAS control pipeline is generated when the RAS Control block issues a load requests command. Upon receiving that signal, the CAS Control block starts a pipelined transaction for Read and Write requests. Speculative Page Open, Mode Register Update, and Refresh commands do not require CAS related operations. However, these requests start down the CAS pipeline for correct completion message timing.

The CAS Control logic is summarized in the following three tables. The first table defines the inputs and the second table defines the outputs. The third table defines the relationship between the inputs and outputs.

CAS Control Block Inputs

| Input | Function |
|---|---|
| blockPrecharge | Flag for Block Precharge state |
| skipToCas | Skip RAS to CAS interval |
| nextRasReq_type | RAS request type |
| nextCasReq_Type | CAS request type |
| rasToCasCount | RAS to CAS counter value |

CAS Control Block Outputs

| Output | Function |
|---|---|
| issueCasReadWithAP | Issue CAS for a read with auto-precharge |
| issueCasReadWoAP | Issue CAS for a read without auto-precharge |
| issueCasWriteWithAP | Issue CAS for a write with auto-precharge |
| issueCasWriteWoAP | Issue CAS for a write without auto-precharge |
| startCasToReadDataCount | Start CAS to read data countdown |
| startWriteDataCtlPipe | Start Data Control block for write |

CAS Control Table

| Inputs | | | | | |
|---|---|---|---|---|---|
| block Pre-charge | skip To Cas | next Ras Req_Type | next Cas Req_Type | ras To Cas Count | Outputs |
| Read Transactions | | | | | |
| 0 | 0 | X | READ | 1 | issueCasReadWithAP<br>startcasToReadDataCount<br>casBank <= nextCasReq_Bank<br>casColumn <= nextCasReq_Column |
| 1 | 0 | X | READ | 1 | issueCasReadWoAP<br>startCasToReadDataCount<br>casBank <= nextCasReq_Bank<br>casColumn <= nextCasReq_Column |
| X | 1 | READ | X | X | issueCasReadWithAP<br>startCasToReadDataCount<br>casBank <= nextRasReq_Bank<br>casColumn <= nextRasReq_Column |
| Write Transactions | | | | | |
| 0 | 0 | X | WRITE or PASS-THRU | 1 | issueCasWriteWithAP<br>startWriteDataCtlPipe<br>casBank <= nextCasReq_Bank<br>casColumn <= nextCasReq_Column |
| 1 | 0 | X | WRITE or PASS-THRU | 1 | issueCasWriteWoAP<br>startWriteDataCtlPipe<br>casBank <= nextCasReq_Bank<br>casColumn <= nextCasReq_Column |
| X | 1 | WRITE or PASS-THRU | X | X | issueCasWriteWithAP<br>startWriteDataCtlPipe<br>casBank <= nextRasReq_Bank<br>casColumn <= nextRasReq_Column |
| Default | | | | | |
| X | X | X | X | X | None |

When the CAS Control block portion of the DRAM Control signals the completion of a request, the Completion Response (compResp) block is responsible for generating a local response message to the CE 30 using the DI2CE_LRP interface.

DI2CE_LRP—Local Response Message from DI 1600 to CE

| Group | Name | Size | Direction |
|---|---|---|---|
| DI2CE_LRP | DI2CE_SB0/1_LRP_VALID | 1 | o |
| | DI2CE_SB0/1_LRP_CMD | 8 | o |
| | DI2CE_SB0/1_LRP_CRB | 3 | o |

Data Control Block 163, 167

Each Data Control block receives requests from its CAS Control block. It coordinates reading the writeBuf and SI Read Response Buffer. It also coordinates writing the FI Read Response Buffer and SI Writeback and Intervention Buffer.

Data Section 180

The data section 180 of the DI interfaces with the datapath of the FI. The interface from FI 22 to DI 1600 allows the FI 22 to write Block Write as well as Uncached data into the DI Write Buffer (writeBuf). The interface from DI 1600 to FI 22 allows the DI 1600 to provide read response data to the FI Read Response Buffer.

The data section 180 of the DI 1600 also interfaces with the datapath of the SI. The interface from SI 24 to DI 1600 allows the DI 1600 to write a Refill Block Write from the SI Read Response Buffer into the DRAM. The interface from DI 1600 to SI 24 allows the DI 1600 to write Victim and Intervention Reads into the SI Writeback and Intervention Buffer. The interfaces between the DI 1600 and SI 24 allow two simultaneous transactions because the DI 1600 contains two super banks of DRAM, and the interfaces connect to the datapath for both super banks.

The data input and data output datapaths for the data section connect the interfaces of the DI 1600 to the DRAM data bus. The input path takes data from either the DI writeBuf or the SI Read Response Buffer and passes the data through an ECC generator on the way to the DRAM output buffers. Each super bank uses its own read port into the dual-ported SI Read Response Buffer. For the output path, the data section reads the input buffers for the DRAM first and performs an ECC check and optional correct next. The ECC encoding for the DI 1600 matches the FSB encoding. After the correction stage, the input path either writes the data in FI Read Response Buffer or the SI Writeback and Intervention Data Buffer.

The above descriptions explain the FI 22 and SI 24 interfaces for the data section of the DI 1600. The next two sections explain the input and output datapaths going to and from the DRAM to the interfaces.

Incoming Data Interface from FI 22 to DI 1600

The Incoming Data Interface from FI 22 to DI (FI2DI_DATA) allows the FI 22 to write Block Write as well as Uncached data into the DI Write Buffer (writeBuf), FI2DI_SB0/1 DATA_DATA_VALID is asserted to indicate valid data, FI2DI_SB0/1_DATA_WR_ADDR provides the DI writeBuf index, FI2DI_SB0/1_DATA_TAIL is asserted to indicate the last cycle of an access, DI2DI_SB0/1_DATA_DATA contains the write data, and FI2DI_SB0/1_DATA_UCE is asserted when the write data contains an uncorrectable error.

FI2DI_DATA—Incoming Data from FI 22 to DI 1600

| Group | Name | Size | Direction |
|---|---|---|---|
| FI2DI_DATA | FI2DI_SB0/1_DATA_DATA_VALID | 1 | i |
| | FI2DI_SB0/1_DATA_WR_ADDR | 4 | i |
| | FI2DI_SB0/1_DATA_TAIL | 1 | i |
| | FI2DI_SB0/1_DATA_DATA | 128 | i |
| | FI2DI_SB0/1_DATA_UCE | 2 | i |

Outgoing Data Interface from DI 1600 to FI 22

The Outgoing Data Interface from DI 1600 to FI 22 (DI2FI_DATA) provides a path for the DI 1600 to supply read response data to the FI Read Response Buffer. DI2FI_SB0/1_DATA_DATA_VALID is asserted to indicate valid data. DI2FI_SB0/1_DATA_WR_ADDR provides the FI Read Response Buffer index. DI2FI_SB0/1_DATA_DATA_TAIL is asserted to indicate the last cycle of an access. DI2FI_SB0/1_DATA_DATA contains the read response data and DI2FI_SB0/1_DATA_UCE is asserted when the read response data contains an uncorrectable error. The read response data is provided in one cycle for uncached accesses and in four contiguous cycles for cached accesses.

DI2FI_DATA—Outgoing Data from DI 1600 to FI 22

| Group | Name | Size | Direction |
|---|---|---|---|
| DI2FI_DATA | DI2FI_SB0/1_DATA_DATA_VALID | 1 | o |
| | DI2FI_SB0/1_DATA_DATA_WR_ADDR | 4 | o |
| | DI2FI_SB0/1_DATA_DATA_TAIL | 1 | o |
| | DI2FI_SB0/1_DATA_DATA | 128 | o |
| | DI2FI_SB0/1_DATA_UCE | 2 | o |

Incoming Address Interface from SI 24 to DI 1600

The Incoming Address Interface from SI to DI (SI2DI ADDR) allows the DI 1600 to address the SI Read Response buffer. To read the SI Read Response Buffer, the DI 1600 asserts SI2DI_SB0/1_ADDR_RD_VALID and provides the Read Response Buffer index on SI2DI_SB0/1_ADDR_RD_ADDR.

SI2DI_ADDR—Incoming Address from SI 24 to DI 1600

| Group | Name | Size | Direction |
|---|---|---|---|
| SI2DI_ADDR | SI2DI_SB0/1_ADDR_RD_VALID | 1 | o |
| | SI2DI_SB0/1_ADDR_RD_ADDR | 5 | o |

The Incoming Data Interface from SI to DI (SI2DI_DATA) allows the DI 1600 to read the contents of the SI Read Response Buffer. The SI 24 provides the SI2DI_SB0/1_FILLED_ENTRIES to indicate which Read Response Buffers contain a full (128) bytes. This interface resides in the SysAD Bus 200 MHz domain and must be synchronized in the DI 1600 to the 133 MHz domain. SI2DI_SB0/1_DATA_DATA_VALID is unused by the SI 24 and DI 1600, SI2DI_SB0/1_DATA_DATA contains the Read Response Buffer data and SI2DI_SB0/1_DATA_UCE is asserted when the Read Response Buffer data contains an uncorrectable error.

SI2DI_DATA—Incoming Data from SI 24 to DI 1600

| Group | Name | Size | Direction |
|---|---|---|---|
| SI2DI_DATA | SI2DI_SB0/1_DATA_FILLED_ENTRIES | 8 | i |
| | SI2DI_SB0/1_DATA_DATA_VALID | 1 | i |
| | SI2DI_SB0/1_DATA_DATA | 128 | i |
| | SI2DI_SB0/1_DATA_UCE | 2 | i |

Outgoing Data Interface from DI 1600 to SI

The Outgoing Data Interface from DI to SI (DI2DI_DATA) allows the DI 1600 to write the contents of the SI Writeback and Intervention Buffers.

DI2DI_SB0/1_DATA_DATA_VALID is asserted to indicate valid data. DI2DI_SB0/1_DATA_WR_ADDR provides the SI Writeback and Intervention Buffer index. DI2DI_SB0/1_DATA TAIL is asserted to indicate the last cycle of an access. DI2DI_SB0/1_DATA_DATA contains the writeback or intervention data and DI2DI_SB0/1_DATA_UCE is asserted when the write data contains an uncorrectable error.

DI2SI_DATA—Outgoing Data from DI 1600 to SI

| Group | Name | Size | Direction |
|---|---|---|---|
| DI2SI_DATA | DI2SI_SB0/1_DATA_DATA_VALID | 1 | o |
| | DI2SI_SB0/1_DATA_WR_ADDR | 6 | o |
| | DI2SI_SB0/1_DATA_TAIL | 1 | o |
| | DI2SI_SB0/1_DATA_DATA | 128 | o |
| | DI2SI_SB0/1_DATA_UCE | 2 | o |

Input Datapath

The input path takes data from either the writeBuf or the SI Read Response Buffer and passes the data through an ECC generator on the way to the DRAM output buffers. The FI 22 controls writing the writeBuf.

Output Datapath

The output path takes data from the input buffer for the DRAM and performs an ECC check and optional correct on the way to the FI Read Response Buffer or the SI Write and Intervention Buffer.

Terminology

| | |
|---|---|
| x'12AB' or 0x12AB | Hexadecimal value 12AB. |
| asserted | Driven to the active value; depending on the signal, this could be a logic high or a logic low. |
| b'01001' or 0b01001 | Binary value 01001. |
| cell | One or more regions that are configured/grouped together so that they share an environment (e.g., a single operating system) and are all affected by a reboot/reset. |
| clear | Driven to or at a value of '0'. |
| flit | A set of bits covered by a single flow-control operation in one edge. A flit includes all the bits for the transaction: data, control (sideband), and others. |
| frame | A group of bits that is conceptually/logically a single unit. The term does not infer the number of clock cycles required to process the information, nor the unit-size of the bits that are placed simultaneously "on the wire" (either through the Synergy's Crossbar unit or over the Router Network or Crosstalk interfaces). |
| region | A hardwired grouping of one or more processor bridge logic 20s. For systems with up to sisty-four copies of processor bridge logic 20, each region consists on one processor bridge logic 20; for systems between 65 and 256 processor bridge logic 20s, each region consists of eight processor bridge logic 20s. The maximum number of regions is 64. |
| RTL | Register Transfer Level. The abstract level of hardware description where the cycle-by-cycle behavior of the circuit is fixed, but the detailed implementation is not completely nailed down. Synopsys translates RTL into gates. |
| set | Driven to or at a value of '1'. |
| word | 32 bits. Sizes of other entities are expressed in relation to the 32-bit word |

Conclusion

The present invention provides for purging data (e.g., a first cache line) from a middle cache level without purging the corresponding data from a lower cache level (i.e., a cache level closer to the processor using the data), and replacing the purged first data in the middle-level cache with other data (e.g., with another cache line) of a different memory address than the purged first data, while leaving the data of the first cache line in the lower cache level. In some embodiments, in order to allow such mid-level purging, the first cache line must be in the "shared state" that allows reading of the data, but does not permit modifications to the data. If it is desired to modify the data, a directory facility will issue a purge to all caches of the shared-state data for that cache line, and then the processor that wants to modify the data will request an exclusive-state copy to be fetched to its lower-level cache and, in some embodiments, to all intervening levels of cache. Later, when the data in the lower cache level is modified, the modified data can be moved back to the original memory from the caches.

One aspect of the present invention provides a method of maintaining a cache memory in a computer system having a first processor 118, a first memory 116, and a plurality of cache levels between the first processor 118 and the first memory 116 including a first cache level 111 or 110 closer to the first processor and a second cache level 112 closer to the first memory 116. The method includes performing a first shared-state memory access to the first memory 116 by the first processor 118, storing first data from the first memory 1.16 as shared-state data into the second cache level 112 and the first cache level 111, maintaining a cache directory associated with the first memory 116, the cache directory storing information regarding memory data that is cached, purging the first data from the second cache level 112 without purging the corresponding data from the first cache level 111, replacing the purged first data with other data of a different memory address than the purged first data, and then accessing the first data in the first cache level using the first processor.

In some embodiments, the method further includes performing a first exclusive-state memory access to the first memory 116 by the first processor 118, storing the first data from the first memory 116 as exclusive-state data into the second cache level 112 and the first cache level 111, changing the first data in the first cache level 111, and moving the changed first data back to the first memory 116.

In some embodiments, the computer system further includes a second processor 218 and a second memory 216, the second memory 216 coupled to the first memory 116 such that the first processor 118 can access the second memory 216. The method further includes performing a second memory access to the second memory 216 by the first processor 118, storing second data from the second memory 216 into the first cache level 111 and the second cache level 112 of the first processor 118, purging the second data from the second cache level 112 without purging the corresponding data from the first cache level 111, replacing the purged second data with other data of a different memory address than the purged second data, and then accessing the second data in the first cache level using the first processor.

In some embodiments, the method further includes performing a second exclusive-state memory access to the first memory 116 by the first processor 118, storing the second data from the first memory 116 as exclusive-state data into the second cache level 112 and the first cache level 111, changing the second data in the first cache level 111, and moving the changed second data back to the first memory 116.

In some embodiments, the method further includes passing the second data between the node 130 associated with first memory 116 and the node 230 associated with second memory 216 across network 14.

In some embodiments, the computer system further includes a third processor 119 coupled to the second cache level 112 of the first processor 118, the third processor 119 having an associated first cache level 111 separate from the first cache level 111 of the first processor 118. The method further includes performing a third memory access to the second memory 216 by the third processor 119, storing third data from the second memory 216 into the second cache level 112 and the first cache level 111 of the third processor 119, purging the third data from the second cache level 112 without purging the corresponding data from the first cache level 111 of the third processor, replacing the purged third data with other data of a different memory address than the purged third data, and then accessing the third data in the first cache level using the third processor.

In some embodiments, the method further includes performing a third exclusive-state memory access to the second memory 216 by the third processor 118, storing the third data from the first memory 116 as exclusive-state data into the second cache level 112 and the first cache level 111, changing the third data in the first cache level 111 using the third processor, and moving the changed third data back to the first memory 216.

In some embodiments of the method, the computer system further includes a snoop-based cache-coherence protocol for the first cache level and a directory-based cache-coherence protocol for the second cache, and wherein the third data and the second data form separate portions of a single cache line in the second cache level, and the method further includes performing snoop monitoring of cache activity of the third processor by the first processor, and performing snoop monitoring of cache activity of the first processor by the third processor, and updating data in the second level of cache based on the snoop monitoring.

Some embodiments of the method further include maintaining a directory-based cache coherence in the second cache level.

Another aspect of the present invention provides a computer system that includes a first processor 118, a first memory 116 coupled to the first processor 118, a plurality of cache levels between the first processor 118 and the first memory 116 including a first cache level 111 closer to the first processor 118 and a second cache level 112 closer to the first memory 116, a cache directory coupled to the second cache level 112 and associated with the first memory 216, and control circuitry operatively coupled to the second cache level 112, wherein based on the first processor 118 performing a first shaed-state memory access to the first memory 116, the control circuitry stores first data from the first memory 116 into the second cache level 112 and the first cache level 111 as shared-state data and maintains the cache directory, wherein the cache directory stores information regarding memory data that is cached, and the control circuitry also purges the first shared-state data from the second cache level 112 without purging the corresponding data from the first cache level 111, replaces the purged first data with other data of a different memory address than the purged first data, and then accesses the first data in the first cache level using the first processor.

In some embodiments, the system further performs a first exclusive-state memory access to the first memory 116 by the first processor 118, stores the first data from the first memory 116 as exclusive-state data into the second cache level 112 and the first cache level 111, changes the first data in the first cache level 111, and moves the changed first data back to the first memory 116. In some embodiments, a purge of all shared-state copies of the first data from any and all caches having copies thereof is performed as a prerequisite to doing this exclusive-state fetch.

In some embodiments, the system 1500 further includes a second processor 218, a second memory 216 associated with the second processor 218, the second memory 216 coupled to the first processor 118 such that the first processor 118 can access the second memory 216, wherein when the first processor 118 performs a second memory access to the second memory 216, the control circuitry stores second data from the second memory 216 into the second cache level 112 and the first cache level 111 as shared-state data, and the control circuitry also purges the second data from the second cache level without purging the corresponding data from the first cache level, replaces the purged second data with other data of a different memory address than the purged second data, and then accesses the second data in the first cache level using the first processor.

In some embodiments, the system further performs a second exclusive-state memory access to the second memory 216 by the first processor 118, stores the second data from the first memory 216 as exclusive-state data into the second cache level 112 and the first cache level 111, changes the second data in the first cache level 111, and moves the changed second data back to the second memory 216.

In some embodiments, the second data is passed between the first memory and the second memory across a multi processor network.

In some embodiments, the system further includes a third processor 119 coupled to the second cache level 112 of the first processor 118, the third processor 119 having an associated first cache level 111 separate from the first cache level 111 of the first processor 118, wherein when the third processor performs a third shared-state memory access to the second memory 216, the control circuitry stores third data from the second memory into the second cache level and the first cache level of the third processor as shared-state data, and the control circuitry purges the third data from the second cache level without purging the corresponding data from the first cache level 111 of the third processor 119, and replaces the purged third data with other data of a different memory address than the purged third data, and then accesses the third data in the first cache level 111 of the third processor 119.

In some embodiments, the system further performs a third exclusive-state memory access to the second memory 216 by the third processor 119, stores the third data from the second memory 216 as exclusive-state data into the second cache level 112 and the first cache level 111, changes the third data in the first cache level 111, and moves the changed third data back to the second memory 216.

In some embodiments, the first processor 118 further uses a snoop-based cache-coherence protocol for the first cache level and the control circuitry uses a directory-based cache-coherence protocol for the second cache, and wherein the third data and the second data form separate portions of a single cache line in the second cache level, wherein the first processor performs snoop monitoring of cache activity of the third processor, and the third processor performs snoop monitoring of cache activity of the first processor, and the control circuitry updates data in the second level of cache based on the snoop monitoring.

In some embodiments, the control circuitry maintains a directory-based cache coherence in the second cache level.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A computer system comprising:
   a first processor,
   a first memory coupled to the first processor;
   a plurality of cache levels between the first processor and the first memory including a first cache level closer to the first processor and a second cache level closer to the first memory;

cache control circuitry, wherein based on the first processor performing a first memory access to the first memory, the control circuitry stores first data from the first memory into the second cache level and the first cache level;

means for purging the first data from the second cache level without purging the corresponding data from the first cache level, and for replacing the purged first data with other data of a different memory address than the purged first data, and after the first data in the second cache level is replaced, for accessing the first data in the first cache level;

a second processor; and a second memory, the second memory coupled to the first memory such that the first processor can access the second memory, wherein based on the first processor performing a second memory access to the second memory, the cache control circuitry moves second data from the second memory into the first cache level and the second cache level; and means for purging the second data from the second cache level without purging the corresponding data from the first cache level, and replacing the purged second data with other data of a different memory address than the purged second data and after the second data in the second cache level is replaced, for accessing the first data in the first cache level.

2. The system of claim 1, further comprising:

a third processor coupled to the second cache level of the first processor, the third processor having an associated first cache level separate from the first cache level of the first processor, wherein based on the third processor performing a third memory access to the second memory, the cache control circuitry moves third data from the second memory into the first cache level and the second cache level; and means for purging the third data from the second cache level without purging the corresponding data from the first cache level of the third processor, and replacing the purged third data with other data of a different memory address than the purged third data, after the third data in the second cache level is replaced, for accessing the first data in the first cache level.

3. The system of claim 1, the method further comprising:

means for maintaining a directory-based cache coherence in the second cache level.

4. A computer system comprising:

a first processor, a first memory coupled to the first processor;

a plurality of cache levels between the first processor and the first memory including a first cache level closer to the first processor and a second cache level closer to the first memory;

cache control circuitry, wherein based on the first processor performing a first memory access to the first memory, the control circuitry stores first data from the first memory into the second cache level and the first cache level;

means for purging the first data from the second cache level without purging the corresponding data from the first cache level, and for replacing the purged first data with other data of a different memory address than the purged first data, and after the first data in the second cache level is replaced, for accessing the first data in the first cache level;

a second processor coupled to the second cache level of the first processor, the second processor having an associated first cache level separate from the first cache level of the first processor, wherein based on the second processor performing a second memory access to the first memory, the cache control circuitry moves second data from the first memory into the first cache level of the second processor and the second cache level; and means for purging the second data from the second cache level without purging the corresponding data from the first cache level of the second processor, and replacing the purged second data with other data of a different memory address than the purged third data, after the second data in the second cache level is replaced, for accessing the first data in the first cache level.

5. The system of claim 4, the method further comprising:

means for maintaining a directory-based cache coherence in the second cache level.

6. A computer system comprising:

a first processor, a first memory coupled to the first processor;

a plurality of cache levels between the first processor and the first memory including a first cache level closer to the first processor and a second cache level closer to the first memory;

a cache directory coupled to the second cache level and associated with the first memory;

control circuitry operatively coupled to the second cache level, wherein based on the first processor performing a first shared-stated memory access to the first memory, the control circuitry stores first data from the first memory as shared-state data into the second cache level and the first cache level and maintains the cache directory, wherein the cache directory stores information regarding memory data that is cached as shared-state data, and the control circuitry also purges the first data from the second cache level without purging the corresponding data from the first cache level, and replaces the purged first data with other data of a different memory address than the purged first data, and the first processor then accesses the first data in the first cache level;

a second processor;

a second memory associated with the second processor, the second memory coupled to the first memory such that the first processor can access the second memory, wherein when the first processor performs a second memory access to the second memory, the control circuitry stores second data from the second memory into the second cache level and the first cache level, and the control circuitry also purges the second data from the second cache level without purging the corresponding data from the first cache level, and replaces the purged second data with other data of a different memory address than the purged second data, and if the first processor needs to change data, the first processor performs a second exclusive-state memory access to the second memory, stores the second data from the second memory as exclusive-state data into the second cache level and the first cache level, and after the second data in the first cache level is changed, the control circuitry moves the changed second data back to the second memory.

7. The system of claim 6, wherein the second data is passed between the first memory and the second memory across a multi processor network.

8. The system of claim 6, further comprising:

a third processor coupled to the second cache level of the first processor, the third processor having an associated first cache level separate from the first cache level of the first processor, wherein when the third processor performs a third memory access to the second memory, the control circuitry stores third data from the second memory into the second cache level and the first cache level of the third processor, and the control circuitry purges the third data from the second cache level without purging the corresponding data from the first cache level of the third processor, and replaces the purged third data with other data of a different memory address than the purged third data, and if the third processor needs to change data, the third processor performs a third exclusive-state memory access to the second memory, stores the third data from the second memory as exclusive-state data into the second cache level and the first cache level, and after the third data in the first cache level is changed, the control circuitry moves the changed third data back to the second memory.

9. The system of claim 8, wherein the first processor further uses a snoop-based cache-coherence protocol for the first cache level and the control circuitry uses a directory-based cache-coherence protocol for the second cache, and wherein the third data and the second data form separate portions of a single cache line in the second cache level, wherein the first processor performs snoop monitoring of cache activity of the third processor, and the third processor performs snoop monitoring of cache activity of the first processor, and the control circuitry updates data in the second level of cache based on the snoop monitoring.

10. The system of claim 9, wherein the control circuitry maintains a directory-based cache coherence in the second cache level.

11. The system of claim 8, wherein the first processor further uses a snoop-based cache-coherence protocol for the first cache level and the control circuitry uses a directory-based cache-coherence protocol for the second cache, and wherein the third data and the second data form separate portions of a single cache line in the second cache level, wherein the first processor performs snoop monitoring of cache activity of the third processor, and the control circuitry updates data in the second level of cache based on the snoop monitoring.

12. The system of claim 8, wherein the control circuitry maintains a directory-based cache coherence in the second cache level.

13. The system of claim 6, wherein the control circuitry maintains a directory-based cache coherence in the second cache level.

14. A computer system comprising:

a first processor, a first memory coupled to the first processor;

a plurality of cache levels between the first processor and the first memory including a first cache level closer to the first processor and a second cache level closer to the first memory;

a cache directory coupled to the second cache level and associated with the first memory;

control circuitry operatively coupled to the second cache level, wherein based on the first processor performing a first shared-stated memory access to the first memory, the control circuitry stores first data from the first memory as shared-state data into the second cache level and the first cache level and maintains the cache directory, wherein the cache directory stores information regarding memory data that is cached as shared-state data, and the control circuitry also purges the first data from the second cache level without purging the corresponding data from the first cache level, and replaces the purged first data with other data of a different memory address than the purged first data and the first processor then accesses the first data in the first cache level;

a second processor coupled to the second cache level of the first processor, the second processor having an associated first cache level separate from the first cache level of the first processor, wherein when the second processor performs a second memory access to the first memory, the control circuitry stores second data from the second memory into the second cache level and the first cache level of the second processor, and the control circuitry purges the second data from the second cache level without purging the corresponding data from the first cache level of the second processor, and replaces the purged second data with other data of a different memory address than the purged second data, and if the second processor needs to change data, the second processor performs a third exclusive-state memory access to the second memory, stores the second data from the second memory as exclusive-state data into the second cache level and the first cache level of the second processor, and after the second data in the first cache level of the second processor is changed, the control circuitry moves the changed second data back to the second memory.

15. The system of claim 14, wherein the first processor further uses a snoop-based cache-coherence protocol for the first cache level and the control circuitry uses a directory-based cache-coherence protocol for the second cache, and wherein the third data and the second data form separate portions of a single cache line in the second cache level, wherein the first processor performs snoop monitoring of cache activity of the third processor, and the third processor performs snoop monitoring of cache activity of the first processor, and the control circuitry updates data in the second level of cache based on the snoop monitoring.

16. The system of claim 14, wherein the control circuitry maintains a directory-based cache coherence in the second cache level.

17. A method of maintaining a cache memory in a computer system having a first processor, a first memory, and a plurality of cache levels between the first processor and the first memory including a first cache level closer to the first processor and a second cache level closer to the first memory, wherein the computer system further includes a second processor and a second memory, the second memory coupled to the first memory such that the first processor can access the second memory, the method comprising:

performing a first shared-state memory access to the first memory by the first processor, storing first data from the first memory as shared-state data into the second cache level and the first cache level;

maintaining a cache directory associated with the first memory, the cache directory storing information regarding memory data that is cached;

purging the first data from the second cache level without purging the corresponding data from the first cache level, and replacing the purged first data with other data of a different memory address than the purged first data;

performing a first exclusive-state memory access to the first memory by the first processor;

storing the first data from the first memory as exclusive-state data into the second cache level and the first cache level;

changing the first data in the first cache level; moving the changed first data back to the first memory;

performing a second shared-state memory access to the second memory by the first processor;

storing second data from the second memory as shared-state data into the first cache level and the second cache level;

purging the second data from the second cache level without purging the corresponding data from the first cache level, and replacing the purged second data with other data of a different memory address than the purged second data;

performing a second exclusive-state memory access to the second memory by the first processor;

storing the second data from the second memory as exclusive-state data into the second cache level and the first cache level;

changing the second data in the first cache level; and moving the changed second data back to the second memory.

18. The method of claim 17, further comprising:

passing the second data between the second memory and the first memory across a multi processor network.

19. The method of claim 17, wherein the computer system further includes a third processor coupled to the second cache level of the first processor, the third processor having an associated first cache level separate from the first cache level of the first processor, the method further comprising:

performing a third shared-state memory access to the second memory by the third processor;

storing third data from the second memory as shared-state data into the second cache level and the first cache level of the third processor;

purging the third data from the second cache level without purging the corresponding data from the first cache level of the third processor, and replacing the purged third data with other data of a different memory address than the purged third data;

performing a third exclusive-state memory access to the second memory by the third processor;

storing the second data from the second memory as exclusive-state data into the second cache level and the first cache level;

changing the third data in the first cache level of the third processor; and moving the changed third data back to the second memory.

20. The method of claim 19, wherein the computer system further includes a snoop-based cache-coherence protocol for the first cache level and a directory-based cache-coherence protocol for the second cache, and wherein the third data and the second data form separate portions of a single cache line in the second cache level, the method further comprising:

performing snoop monitoring of cache activity of the third processor by the first processor, and performing snoop monitoring of cache activity of the first processor by the third processor; and updating data in the second level of cache based on the snoop monitoring.

21. The method of claim 20, the method further comprising:

maintaining a directory-based cache coherence in the second cache level.

22. The method of claim 19, the method further comprising:

maintaining a directory-based cache coherence in the second cache level.

23. The method of claim 19, wherein the computer system further includes a snoop-based cache-coherence protocol for the first cache level and a directory-based cache-coherence protocol for the second cache, and wherein the first data and the second data form separate portions of a single cache line in the second cache level, the method further comprising:

performing snoop monitoring of cache activity of the second processor by the first processor; and updating data in the second level of cache based on the snoop monitoring.

24. The method of claim 17, the method further comprising:

maintaining a directory-based cache coherence in the second cache level.

25. A method of maintaining a cache memory in a computer system having a first processor, a first memory, and a plurality of cache levels between the first processor and the first memory including a first cache level closer to the first processor and a second cache level closer to the first memory, wherein the computer system further includes a second processor coupled to the second cache level of the first processor, the second processor having an associated first cache level separate from the first cache level of the first processor, the method comprising:

performing a first shared-state memory access to the first memory by the first processor;

storing first data from the first memory as shared-state data into the second cache level and the first cache level;

maintaining a cache directory associated with the first memory, the cache directory storing information regarding memory data that is cached;

purging the first data from the second cache level without purging the corresponding data from the first cache level, and replacing the purged first data with other data of a different memory address than the purged first data;

performing a first exclusive-state memory access to the first memory by the first processor;

storing the first data from the first memory as exclusive-state data into the second cache level and the first cache level;

changing the first data in the first cache level; moving the changed first data back to the first memory;

performing a second shared-state memory access to the second memory by the second processor;

storing second data from the second memory as shared-state data into the second cache level and the first cache level of the second processor;

purging the second data from the second cache level without purging the corresponding data from the first cache level of the second processor, and replacing the purged second data with other data of a different memory address than the purged second data;

performing a second exclusive-state memory access to the second memory by the third second processor;

storing the second data from the second memory as exclusive-state data into the second cache level and the first cache level;

changing the second data in the first cache level of the second processor; and moving the changed second data back to the second memory.

26. The method of claim 25, further comprising:

passing the second data between the second memory and the first memory across a multi processor network.

27. The method of claim 25, wherein the computer system further includes a snoop-based cache-coherence protocol for the first cache level and a directory-based cache-coherence protocol for the second cache, and wherein the first data and the second data form separate portions of a single cache line in the second cache level, the method further comprising:

performing snoop monitoring of cache activity of the second processor by the first processor; and updating data in the second level of cache based on the snoop monitoring.

28. The method of claim 25, wherein the computer system further includes a snoop-based cache-coherence protocol for the first cache level and a directory-based cache-coherence protocol for the second cache, and wherein the first data and the second data form separate portions of a single cache line in the second cache level, the method further comprising:

performing snoop monitoring of cache activity of the second processor by the first processor, and performing snoop monitoring of cache activity of the first processor by the second processor; and updating data in the second level of cache based on the snoop monitoring.

29. The method of claim 25, the method further comprising:

maintaining a directory-based cache coherence in the second cache level.

* * * * *

UNITED STATES PATENT AND TRADEMARK OFFICE
CERTIFICATE OF CORRECTION

PATENT NO. : 6,681,293 B1
DATED : January 20, 2004
INVENTOR(S) : Solomon et al.

It is certified that error appears in the above-identified patent and that said Letters Patent is hereby corrected as shown below:

Title page,
Item [56], References Cited, U.S. PATENT DOCUMENTS, delete "1/1990" and insert -- 6/1990 --, therefor.
OTHER PUBLICATIONS, "The SA27 library…" reference, delete "used!" and insert -- used? --, therefor.

Column 1,
Lines 11 and 18, delete "2000:" and insert -- 2000; --, therefor.

Column 56,
Line 56, delete "," and insert -- ; --, therefor.

Column 58,
Line 64, after "the" delete "third".

Signed and Sealed this

Third Day of August, 2004

JON W. DUDAS
*Acting Director of the United States Patent and Trademark Office*